US010824104B2

(12) United States Patent
Araki

(10) Patent No.: US 10,824,104 B2
(45) Date of Patent: Nov. 3, 2020

(54) IMAGE FORMING APPARATUS

(71) Applicant: CANON KABUSHIKI KAISHA, Tokyo (JP)

(72) Inventor: Go Araki, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/268,640

(22) Filed: Feb. 6, 2019

(65) Prior Publication Data

US 2019/0250546 A1 Aug. 15, 2019

(30) Foreign Application Priority Data

Feb. 13, 2018 (JP) ................................ 2018-022878

(51) Int. Cl.

| | |
|---|---|
| ***G06F 3/12*** | (2006.01) |
| ***G06F 15/00*** | (2006.01) |
| ***G06K 1/00*** | (2006.01) |
| ***G03G 15/00*** | (2006.01) |
| ***G03G 15/043*** | (2006.01) |

(52) U.S. Cl.

CPC ....... *G03G 15/5025* (2013.01); *G03G 15/043* (2013.01); *G03G 15/5087* (2013.01)

(58) Field of Classification Search

CPC ............. G03G 15/5025; G03G 15/043; G03G 15/5087; G03G 15/06; G06K 15/14; H01J 9/2276

See application file for complete search history.

(56) References Cited

U.S. PATENT DOCUMENTS

2005/0152716 A1* 7/2005 Agata ................ G03G 15/0194 399/223
2006/0109491 A1 5/2006 Naito et al.
(Continued)

FOREIGN PATENT DOCUMENTS

EP 1801660 A2 6/2007
JP H08227222 A 9/1996
(Continued)

OTHER PUBLICATIONS

Extended European Search Report issued in European Appln. No. 19156356.8 dated Jul. 24, 2019.

*Primary Examiner* — Moustapha Diaby
(74) *Attorney, Agent, or Firm* — Rossi, Kimms & McDowell LLP

(57) ABSTRACT

An image forming apparatus configured to form an image in a first mode and in a second mode in which the image forming apparatus is operated under an image forming condition in which developer supplying capability from a developer carrying member to an image bearing member is increased to form the image, the image forming apparatus including: a determination unit configured to determine whether an input image is an image in a predetermined condition in which the input image is a fine line having a predetermined width or less, a miniature image, or a character having predetermined points or less; and a correction unit configured to set a line width thin or lighten density for an image determined as the image in the predetermined condition by the determination unit at a time of forming the image in the second mode.

15 Claims, 13 Drawing Sheets

(56) References Cited

U.S. PATENT DOCUMENTS

| | | | | |
|---|---|---|---|---|
| 2010/0196030 | A1* | 8/2010 | Okubo ............... | G03G 15/0121 399/53 |
| 2011/0135337 | A1* | 6/2011 | Saito .................... | G03G 15/553 399/79 |
| 2011/0299866 | A1* | 12/2011 | Kadota .................. | G03G 15/50 399/50 |
| 2016/0048099 | A1* | 2/2016 | Nakano ............. | G03G 15/0121 358/1.1 |
| 2016/0161883 | A1* | 6/2016 | Ono ................... | G03G 15/5008 399/53 |
| 2016/0291507 | A1* | 10/2016 | Nakayama ......... | G03G 15/0849 |

FOREIGN PATENT DOCUMENTS

| | | | |
|---|---|---|---|
| JP | H0943931 | A | 2/1997 |
| JP | H10210314 | A | 8/1998 |
| JP | 2013210489 | A | 10/2013 |

* cited by examiner

| | | |
|---|---|---|
| -1 | 0 | 1 |
| -2 | 0 | 2 |
| -1 | 0 | 1 |

| | | |
|---|---|---|
| -1 | -2 | 1 |
| 0 | 0 | 0 |
| -1 | -2 | 1 |

| | | |
|---|---|---|
| 0 | 1 | 0 |
| 1 | -4 | 1 |
| 0 | 1 | 0 |

IMAGE FORMING APPARATUS

BACKGROUND OF THE INVENTION

Field of the Invention

The present invention relates to an image forming apparatus using an electrophotographic printing method.

Description of the Related Art

In recent years, in an image forming apparatus configured to form a color image on a recording material through use of an electrophotographic printing method, for example, as a color laser printer, a color range (color gamut) is becoming important as one of high image quality indexes of an output image. The color gamut represents a color reproducibility range of colors which can be reproduced by the image forming apparatus. As the color gamut is wider, the image forming apparatus has a wider color reproducibility range. In the color image forming apparatus, as a method for widening the color gamut, for example, developers of dark Y, dark M, and dark C are separately added to developers of four colors (Y, M, C, and K) which are usually used, to achieve a wide color gamut through use of the developers of more than four colors.

As another method, it is conceivable that a more developer amount (hereinafter referred to as "toner amount") than a usual developer amount is applied on a recording material to widen a color gamut of an output image on the recording material on which a developer is fixed as compared with a usual color gamut. As a method of changing the toner amount, it is conceivable to change a circumferential speed ratio between a developing roller as a developer carrying member and a photosensitive drum as an image bearing member. As a method of changing the circumferential speed ratio between the developing roller and the photosensitive drum, there has been proposed a method of changing the rotation speed of the developing roller to adjust hue in a secondary color (red color) (for example, see Japanese Patent Application Laid-Open No. H08-227222). Further, there has been proposed a method of reducing the rotation speed of the photosensitive drum to achieve improvement with respect to image graininess such as scattering of a toner and smudging of an image (for example, see Japanese Patent Application Laid-Open No. 2013-210489).

However, in the related art, there are the following problems. In the method in which the developers of more than four colors are used by adding the developers of the dark Y, the dark M, and the dark C, with the increase in the number of types of developers, the number of image forming units is increased, with the result that the size of the image forming apparatus is increased. Further, in the method of differentiating the circumferential speed of the photosensitive drum from the circumferential speed of the developing roller, the color gamut can be widened in, for example, a photograph and a graphic image. However, when the toner amount on the recording material is increased to the maximum to widen the color gamut by the method of differentiating the circumferential speed of the photosensitive drum from the circumferential speed of the developing roller, blur in a minute image and a small character image (hereinafter referred to as "miniature image") formed of fine lines, and scattering occur, which may lower visibility.

SUMMARY OF THE INVENTION

In order to solve the above-mentioned problems, according to an embodiment of the present invention, there is provided an image forming apparatus comprising:

an exposure unit configured to emit light according to a drive signal corresponding to input image data;

an image bearing member on which an electrostatic latent image is formed by an exposure of the exposure unit;

a developer carrying member configured to develop the electrostatic latent image on the image bearing member with a developer, the image forming apparatus being configured to form an image in a first mode and in a second mode in which the image forming apparatus is operated under an image forming condition in which developer supplying capability from the developer carrying member to the image bearing member is increased to form the image;

a determination unit configured to determine whether an input image is an image in a predetermined condition in which the input image is a fine line having a predetermined width or less, a miniature image, or a character having predetermined points or less; and a correction unit configured to set a line width thin or lighten density for an image determined as the image in the predetermined condition by the determination unit at a time of forming the image in the second mode.

Further features of the present invention will become apparent from the following description of exemplary embodiments with reference to the attached drawings.

BRIEF DESCRIPTION OF THE DRAWINGS

FIG. 4B is a graph for showing a relationship between the toner amount per unit area and reflection density.

FIG. 7A, FIG. 7B, and FIG. 7C are enlarged views of a character part in the first embodiment.

FIG. 11B is a view for illustrating an example of an image correction method of the miniature image correction unit of the third embodiment.

DESCRIPTION OF THE EMBODIMENTS

Figure 1:
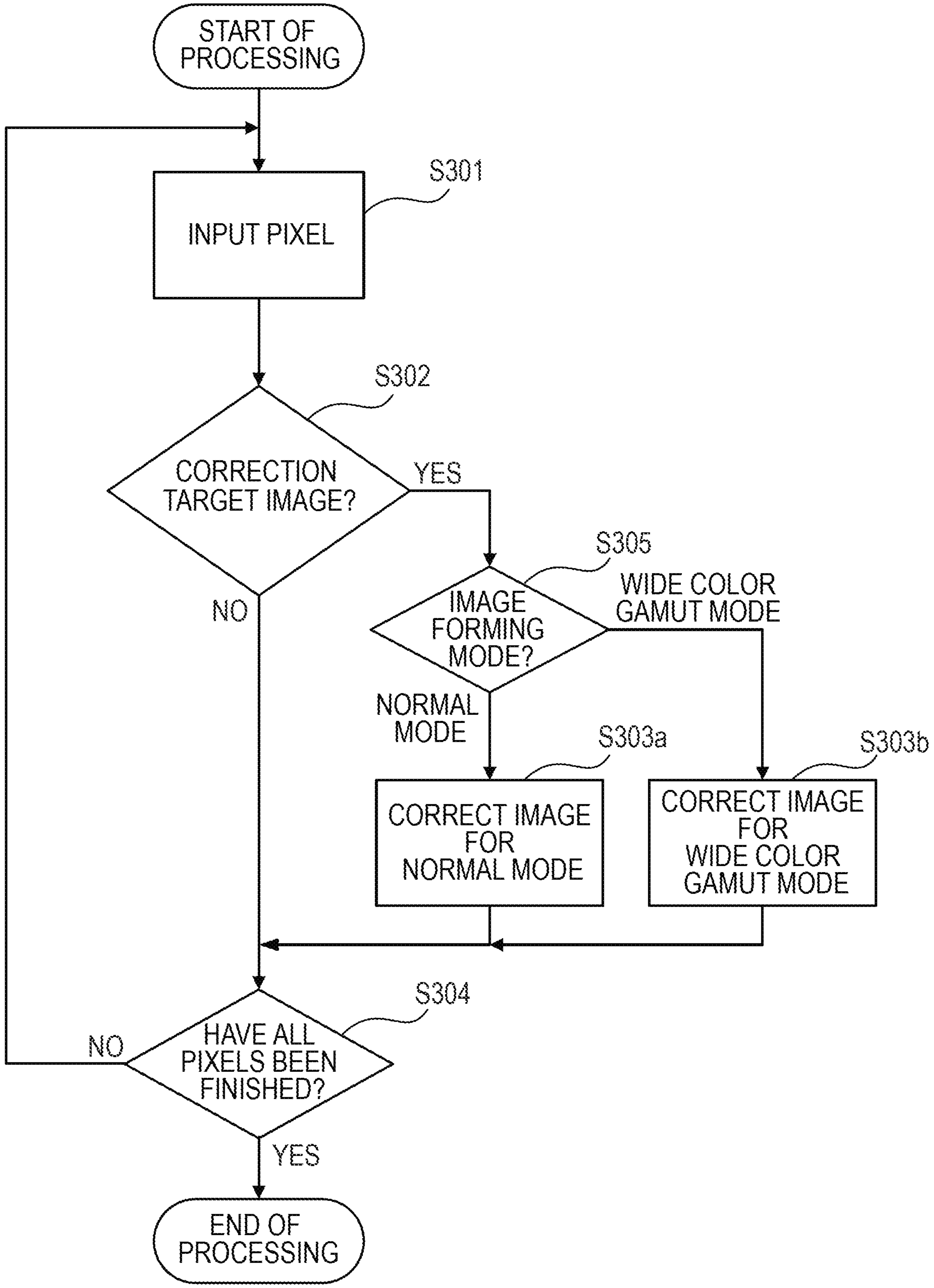
FIG. 1 is a flowchart for illustrating miniature image correction processing in a first embodiment of the present invention.

Exemplary embodiments of the present invention are described in the following in detail with reference to the attached drawings. However, the dimensions, materials, shapes, relative positional relationship, and the like of structural elements described herein should be appropriately changed depending on the structure of the apparatus to which the present invention is applied and various conditions. Specifically, these are not meant to limit the scope of the present invention to the following embodiments.

First Embodiment

An image forming apparatus according to a first embodiment of the present invention includes a copying machine, a laser beam printer (LBP), a printer, a facsimile, a microfilm reader printer, a recorder and the like adopting electrophotographic imaging processing. These image forming apparatus are configured to fix an unfixed toner image, which is formed and borne in an intermediate transfer method or a direct transfer method, of target image information as a fixed image on a recording material (such as a transfer material, a printing sheet, a photosensitive paper, a glossy paper, an OHT, and an electrostatic recording paper) in an imaging processing unit.

The image forming apparatus according to the first embodiment includes two image forming modes including a normal image forming mode as a first image forming operation by which normal image density is obtained, and a wide color gamut image forming mode as a second image forming operation by which a wide color gamut image can be reproduced. The first image forming operation and the second image forming operation are controlled so as to be executable by a controller. In the wide color gamut image forming mode, as compared with the normal image forming mode, a circumferential speed ratio between a developing roller as a developer carrying member and a photosensitive drum as an image bearing member, that is, a ratio of the circumferential speed of the developing roller to the circumferential speed of the photosensitive drum is increased. Therefore, in the respective image forming modes, the circumferential speed ratios between the developing roller and the photosensitive drum are different. In the first embodiment, the first image forming operation is set as the normal image forming mode and the second image forming operation is set as the wide color gamut image forming mode, but the image forming modes are not limited thereto. When the normal image density is set so as to include two types of density, the first image forming operation is set as a first normal image forming mode, and the second image forming operation is set as a second normal image forming mode. The first embodiment has a characteristic in that different image forming methods are used between the normal image forming mode and the wide color gamut image forming mode. Here, the different image forming methods means using different conversion methods between original image data and processed image data.

(Image Forming Apparatus)

Figure 2:
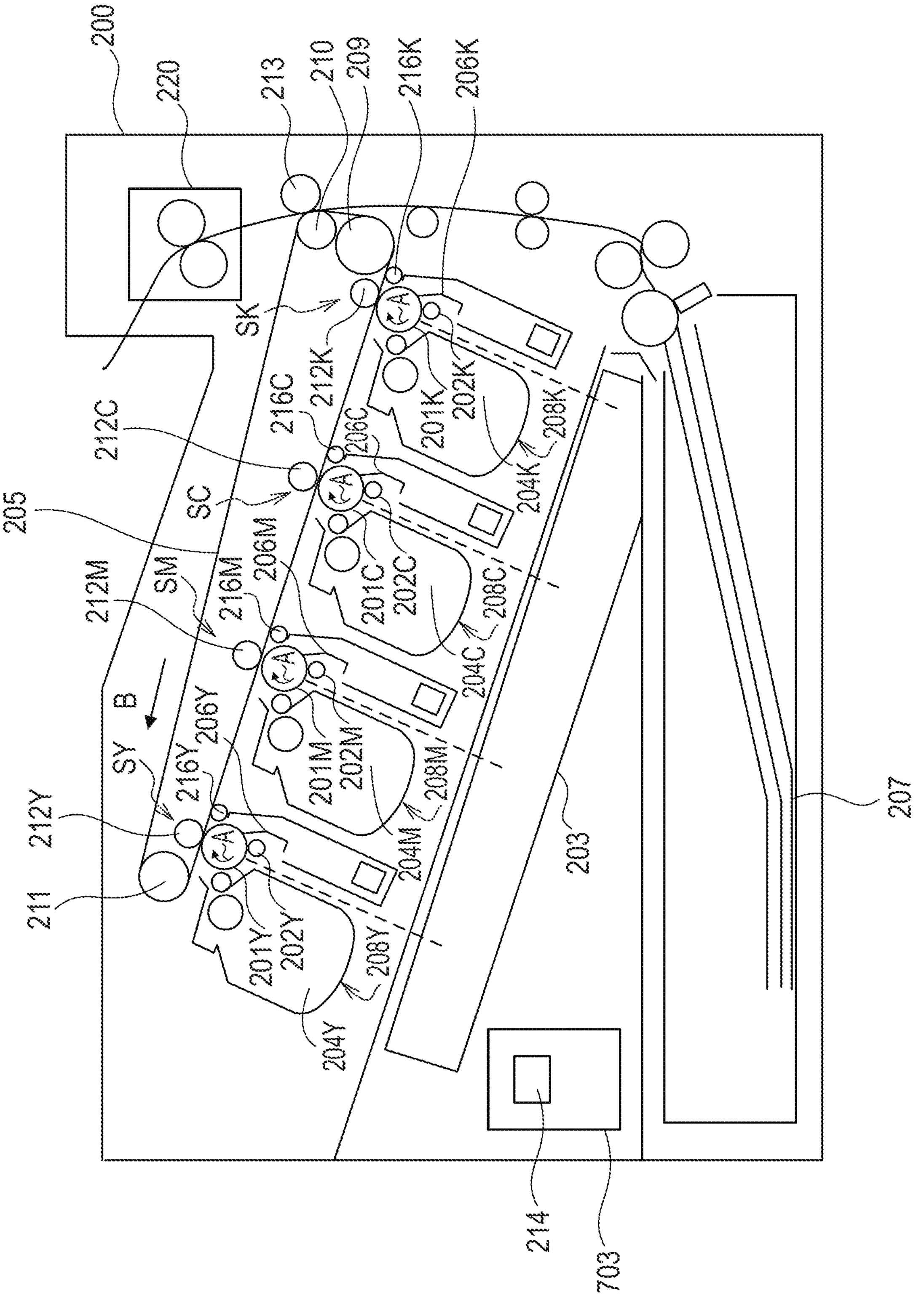
FIG. 2 is a schematic sectional view of an image forming apparatus.

FIG. 2 is a schematic sectional view of an image forming apparatus 200 according to the first embodiment. The image forming apparatus 200 according to the first embodiment is a full color laser printer adopting an in-line type and intermediate transfer type. The image forming apparatus 200 can form a full color image on the recording material (for example, a recording sheet such as a normal paper) based on image information. The image information is input to an engine controller 703 in the image forming apparatus 200 from an image reading device which is connected to the image forming apparatus 200 or from a host personal computer (not shown) such as a personal computer (hereinafter referred to as "PC") communicably connected to the image forming apparatus 200. The engine controller 703 serves as a control unit and includes a CPU 214, a memory (not shown), and the like. Various operations including the image forming operation in the image forming apparatus 200 are controlled by the engine controller 703 as the control unit. Various block diagrams described later with reference to FIG. 5, FIG. 8, FIG. 9A, and FIG. 9B may be formed of a program read out from a nonvolatile memory (not shown) and executed by the CPU 214, or may be formed of an application-specific integrated circuit which is arranged separately from the CPU 214. Alternatively, some of the circuit blocks may be achieved by the CPU 214, and a remainder thereof may be formed of the application specific integrated circuit.

The image forming apparatus 200 includes a first image forming unit SY, a second image forming unit SM, a third image forming unit SC, and a fourth image forming unit SK as a plurality of image forming units, which are configured to form images of yellow (Y), magenta (M), cyan (C) and black (B), respectively. Here, the image forming unit (or an image forming station) includes a process cartridge 208 and a primary transfer roller 212, which is arranged on an opposite side through intermediation of an intermediate transfer belt 205. In the first embodiment, the first to fourth image forming units SY, SM, SC, and SK are arranged in line in a direction crossing a vertical direction and a horizontal direction. In the first embodiment, the configurations and the operations of the first to the fourth image forming units are substantially the same except that the colors of images to be formed are different. Therefore, unless the colors need to be specified, suffixes Y, M, C, and K added to symbols to express which element is directed to a specific color are hereinafter omitted, and general description is made for the image forming units. However, the image forming units are not limited thereto. For example, the image forming unit for the black (K) may be increased in volume so that the image forming unit is increased in size.

The image forming apparatus 200 includes four electrophotographic photosensitive members as a plurality of image bearing members, that is, photosensitive drums 201, which are arranged in parallel with each other in the direction crossing the vertical direction and the horizontal direction. Each photosensitive drum 201 is driven to rotate in a direction of an arrow A (clockwise direction) by a drive unit (drive source) (not shown). A charging roller 202 and a scanner unit (exposure device) 203 are arranged around the photosensitive drum 201. The charging roller 202 is configured to uniformly charge a surface of the photosensitive drum 201. The scanner unit 203 includes, for example, a laser as a light source. The scanner unit 203 is an exposure unit configured to drive the laser based on the image information and to irradiate the photosensitive drum 201 (image bearing member) with a laser beam so as to form an electrostatic image (electrostatic latent image) on the photosensitive drum 201. The laser scans in a scanning direction (hereinafter referred to as "main scanning direction"). A direction orthogonal to the main scanning direction is referred to as "sub-scanning direction".

Further, a developing unit (developing device) 204, a cleaning blade 206, and a pre-exposure LED 216 are arranged around the photosensitive drum 201. The developing unit 204 is a developing unit configured to develop the electrostatic image as a toner image (developer image). The cleaning blade 206 is configured to remove residual toner (transfer residual toner) remaining on the surface of the photosensitive drum 201 after transfer. The pre-exposure LED 216 is an electricity removal unit configured to remove an electric potential of the photosensitive drum 201.

Further, the intermediate transfer belt 205 as an intermediate transfer member is arranged so as to face the four photosensitive drums 201. The intermediate transfer belt 205 is configured to transfer the toner image, which is a developer image on the photosensitive drum 201, to the recording material 207. The process cartridge 208 integrally includes the photosensitive drum 201, the charging roller 202 as a charging unit for the photosensitive drum 201, the developing unit 204, and the cleaning blade 206. The process cartridge 208 is mountable to and removable from an apparatus main body of the image forming apparatus 200. Here, the apparatus main body refers to component parts of the image forming apparatus 200 excluding the process cartridge 208. In the first embodiment, all the process cartridges 208 for respective colors have the same shape, and contain toners of respective colors including yellow (Y), magenta (M), cyan (C) and black (K). Further, the toner in the first embodiment has negative charging characteristics.

The intermediate transfer belt 205 formed of an endless belt as an intermediate transfer member is brought into contact with all the photosensitive drums 201 and rotates in a direction of an arrow B (counterclockwise direction). The intermediate transfer belt 205 is supported by a driving roller 209, a secondary transfer opposing roller 210, and a driven roller 211 as a plurality of supporting members. Four primary transfer rollers 212 as primary transfer units are arranged in parallel with each other on an inner circumferential surface side of the intermediate transfer belt 205 so as to face the photosensitive drums 201. Then, voltage having a polarity opposite to a normal charging polarity of the toner (negative polarity in the first embodiment as described above) is applied from a primary transfer voltage power source (not shown) to each of the primary transfer rollers 212. Accordingly, the toner images on the photosensitive drums 201 are transferred to the intermediate transfer belt 205. Further, a secondary transfer roller 213 as a secondary transfer unit is arranged at a position facing the secondary transfer opposing roller 210 on an outer circumferential surface side of the intermediate transfer belt 205. Then, voltage having a polarity opposite to the normal charging polarity of the toner is applied from a secondary transfer voltage power source (not shown) to the secondary transfer roller 213. Accordingly, the toner images on the intermediate transfer belt 205 are transferred to the recording material 207. Then, the toner images are thermally fixed by a fixing device 220, which is arranged downstream in a conveying direction of the recording material 207. The toner images are thus fixed as a fixed image on the recording material 207.

(Process Cartridge)

Figure 3A:
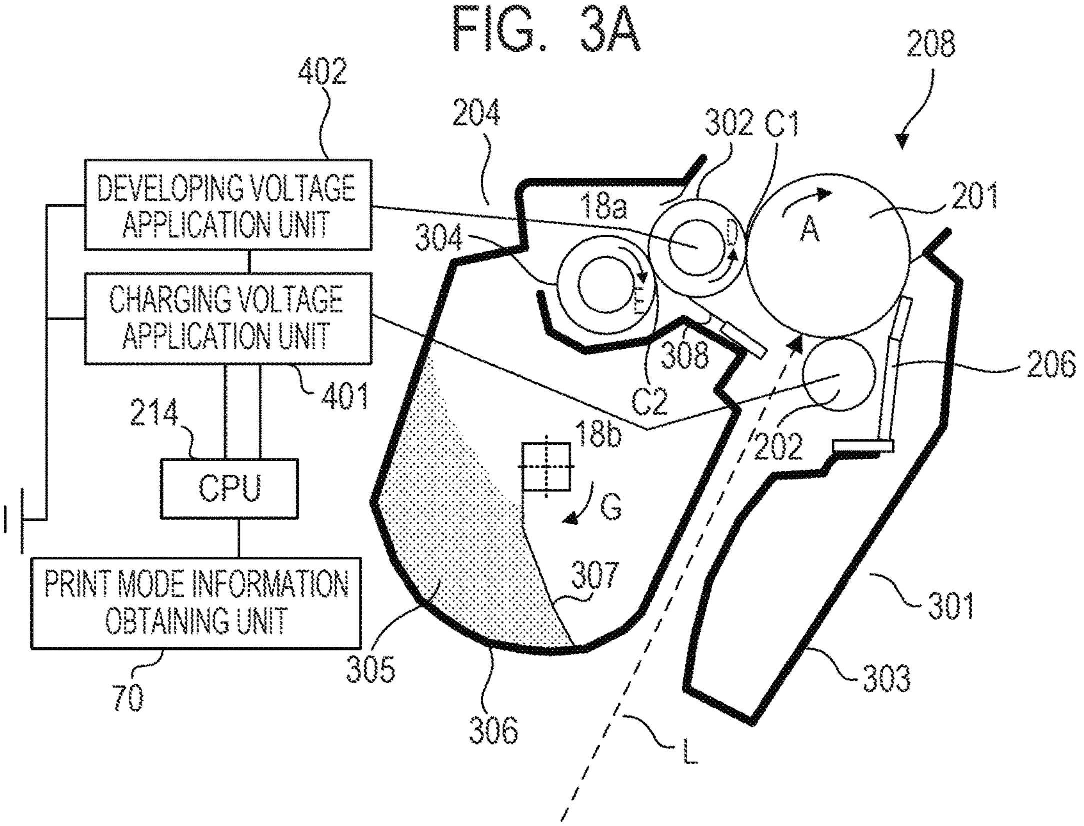
FIG. 3A is a schematic sectional view of a process cartridge.

FIG. 3A is a schematic sectional view of the process cartridge 208 in the first embodiment as seen in a longitudinal direction (rotational axis direction) of the photosensitive drum 201. In the first embodiment, the configuration and the operation of the process cartridge 208 for each color are the same except the type (color) of the contained developer. In FIG. 3A, the process cartridge for yellow (Y) (the suffix Y is omitted) is illustrated as an example. The process cartridge 208 includes a photosensitive member unit 301 and a developing unit 204. The photosensitive member unit 301 includes, for example, the photosensitive drum 201. The developing unit 204 includes, for example, a developing roller 302. The photosensitive member unit 301 includes a cleaning frame body 303 as a frame body configured to support various elements in the photosensitive member unit 301. The photosensitive drum 201 is rotatably mounted to the cleaning frame body 303 through intermediation of a bearing (not shown). Driving force of a drive motor as a drive unit (drive source) described later is transmitted to the photosensitive member unit 301 so that the photosensitive drum 201 is driven to rotate in the direction of the arrow A (clockwise direction) in accordance with the image forming operation. The photosensitive drum 201 serving as a main element in image forming processing is an organic photosensitive member in which an undercoat layer as a carrier generation layer, and a carrier transfer layer functional films are sequentially coated on an outer circumferential surface of an aluminum cylinder. Further, the cleaning blade 206 and the charging roller 202 are arranged on the photosensitive member unit 301 so as to be held in contact with a circumferential surface of the photosensitive drum 201. The toner removed from the surface of the photosensitive drum 201 by the cleaning blade 206 falls into the cleaning frame body 303 to be stored therein.

A roller portion made of conductive rubber in the charging roller 202 is brought into pressure-contact pressure with the photosensitive drum 201 so that the charging roller 202 follows the rotation of the photosensitive drum 201. Here, as a charging step, predetermined DC voltage as charging voltage is applied to a core metal of the charging roller 202 from a charging voltage application unit (high voltage power source) 401 which serves as a voltage applying unit for the charging roller 202 with respect to the photosensitive drum 201. With the application of the predetermined DC voltage, a uniform dark part potential (Vd) is set on the surface of the photosensitive drum 201. The scanner unit 203 described above exposes the photosensitive drum 201 with a laser beam L (broken line) emitted so as to correspond to the image data. On the surface of the exposed photosensitive drum 201, charges are eliminated by carriers from the carrier generation layer so that the potential is lowered. As a result, the exposed portion on the photosensitive drum 201 is set to a predetermined bright part potential (Vl). Meanwhile, an unexposed portion on the photosensitive drum 201 remains in the predetermined dark part potential (Vd), and the electrostatic latent image is formed.

The developing unit 204 includes the developing roller 302 (rotation direction thereof is indicated by an arrow D), a developing blade 308, a toner supply roller 304 (rotation direction thereof is indicated by an arrow E), a toner 305, a toner containing chamber 306 configured to contain the toner 305, and a stirring member 307. The toner containing chamber 306 is divided into a developing chamber 18*a* and a developer containing chamber 18*b*. The developer containing chamber 18*b* is defined below the developing chamber 18*a* and communicates with the developing chamber 18*a* through a communication port defined above the developer containing chamber 18*b*. The toner 305 is stirred in the toner containing chamber 306 by movement of the stirring member 307 as a developer conveying member (rotation direction thereof is indicated by an arrow G). In the first embodiment, as described above, the toner having a negative polarity as a normal charging polarity is used, and the following description is based on a case of using the negatively charged toner. However, the toner which can be used in the present invention is not limited to the negatively charged toner, and a toner having a positive polarity as a normal charging polarity may be used depending on the apparatus configuration.

The developing roller 302 is arranged in the developing chamber 18*a*. The developing roller 302 is brought into contact with the photosensitive drum 201 and rotates in the direction indicated by the arrow D by receiving driving force from a drive motor 52 or a drive motor 53 as a drive unit illustrated in FIG. 3B. In the first embodiment, surfaces of the developing roller 302 and the photosensitive drum 201 are moved to rotate respectively in the same direction at a facing portion (contact portion C1) at which the toner 305 contained in the developing roller 302 is supplied to the photosensitive drum 201. Further, the developing roller 302 receives predetermined DC voltage (developing voltage), which is applied thereto from a developing voltage application unit (high voltage power source) 402 and is sufficient to develop and form the electrostatic latent image on the photosensitive drum 201 into a visible toner image (developer image). At the contact portion C1 at which the developing roller 302 is brought into contact with the photosensitive drum 201, the toner is transferred only to the potential portion of the bright part based on the potential difference therebetween, to thereby form the electrostatic latent image into a visible image. That is, the electrostatic latent image is an image formed by the potential portion of the bright part, which is a first potential portion to which the toner adheres, and the potential portion of the dark part, which is a second potential portion to which the toner does not adhere.

The toner supply roller (hereinafter referred to as "supply roller") 304 and the developing blade (hereinafter referred to as "regulating member") 308 as a toner amount regulating member are further arranged in the developing chamber 18*a*. The supply roller 304 is configured to supply the toner 305, which is conveyed from the developer containing chamber 18*b*, to the developing roller 302. The supply roller 304 is an elastic sponge roller having a conductive core metal, and a foam layer is formed around an outer circumference of the conductive core metal. The supply roller 304 is arranged, at a facing portion to the developing roller 302, to form a predetermined contact portion C2 (contact portion) on a circumferential surface of the developing roller 302. The developing blade 308 regulates a coating amount of the toner supplied by the supply roller 304 on the developing roller 302 and imparts an electric charge. The supply roller 304 receives voltage applied thereto from a high voltage power source (not shown) as a voltage application unit.

Here, the voltage applied to the developing voltage application unit 402, the charging voltage application unit 401, and the supply roller 304 by a voltage power source is controlled by the CPU 214 in the engine controller 703 as a control unit based on information obtained by a print mode information obtaining unit 70. The print mode information obtaining unit 70 obtains information and the like input from an operation panel (not shown) of the image forming apparatus 200, a printer driver, or a host PC.

(Drive Connection Configuration)

Figure 3B:
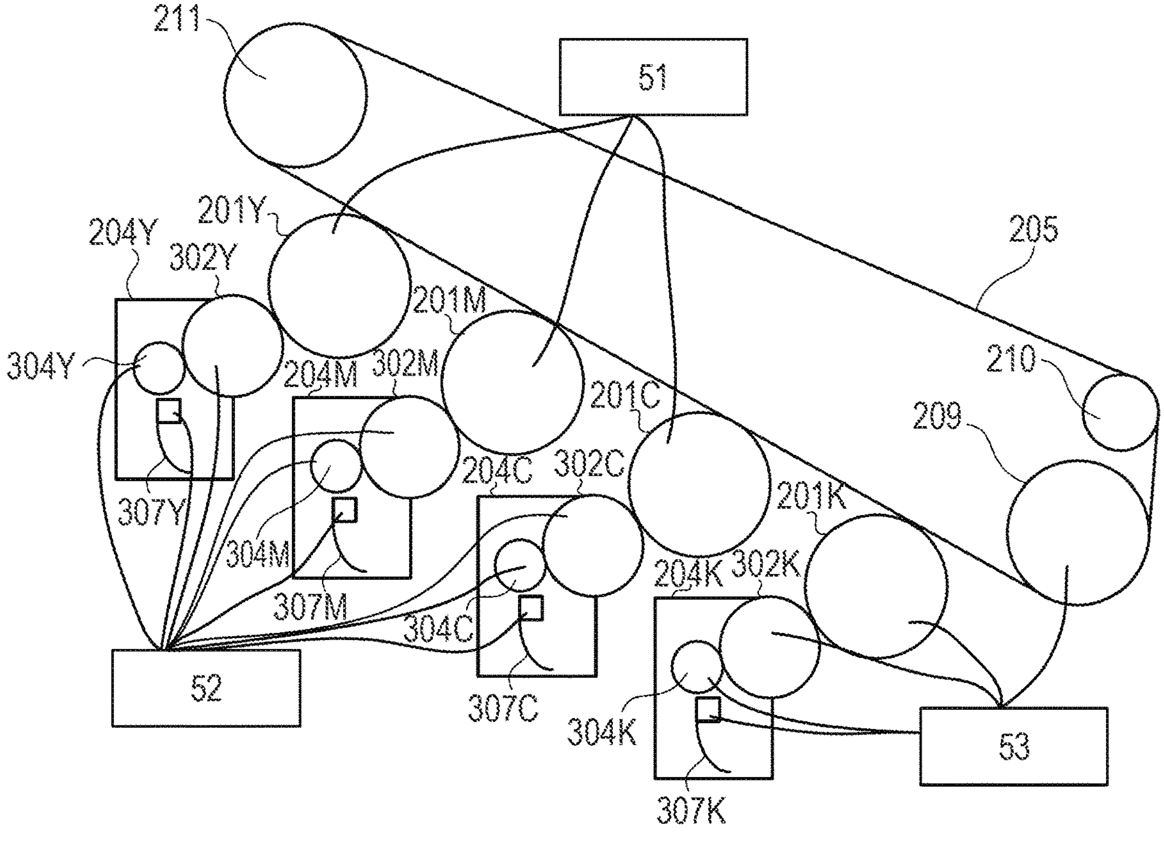
FIG. 3B is a schematic view of a driving connection configuration.

As illustrated in FIG. 3B, in the first embodiment, for driving shafts of the photosensitive drum 201, the developing roller 302, the stirring member 307, the drive unit, and the supply roller 304 are different from each other depending on the process cartridges 208. FIG. 3B is a schematic view for illustrating a drive connection configuration in the first embodiment. The process cartridges 208 of yellow (Y), magenta (M), and cyan (C) are configured as follows. That is, as illustrated in FIG. 3B, a drive unit which is configured to drive the photosensitive drums 201Y, 201M, and 201C to rotate, and a different drive unit which is configured to drive the developing rollers 302Y, 302M, and 302C to rotate have separate drive sources. A first drive unit which is configured to drive the photosensitive drums 201Y, 201M, and 201C to rotate includes a drive motor 51 and a gear train (not shown) which is configured to transmit rotational driving force of the drive motor 51, and the like. Meanwhile, a second drive unit which is configured to drive the developing rollers 302Y, 302M, and 302C to rotate includes a drive motor 52 and a gear train (not shown) which is configured to transmit rotational driving force of the drive motor 52, and the like. The drive motor 52 further serves as a drive unit which is configured to drive rotary shafts of the stirring members 307Y 307M, and 307C to rotate in association with another gear train (not shown). In addition, the drive motor 52 further serves as a drive unit which is configured to drive the supply rollers 304Y, 304M, and 304C to rotate in association with still another gear train (not shown).

The process cartridge 208 of black (K) uses a common drive unit 53 for a drive unit which is configured to drive the photosensitive drum 201K to rotate, a drive unit which is configured to drive the developing roller 302K to rotate, and a drive unit which is configured to drive the supply roller 304K to rotate. Further, the drive motor 53 serves as a drive unit which is configured to drive a rotation shaft of the stirring member 307K to rotate in association with another gear train (not shown). The drive motor 53 serves as a drive unit which is configured to drive the driving roller 209 for circularly moving the intermediate transfer belt 205 to rotate in association with still another gear train (not shown). Those various drive motors and the gear trains correspond to the drive units which can individually, variably, and rotatably drive the image bearing members, the developer bearing members, the supplying members, and the conveying members in the present invention, and are controlled by the engine controller 703 as a control unit.

In the related art, the photosensitive drum and the developing roller are driven by the same drive source (drive motor) through intermediation of the gear train. Therefore, a circumferential speed ratio between the developing roller and the photosensitive drum is uniquely determined by a gear ratio and is fixed. Meanwhile, in the first embodiment, the photosensitive drums 201Y, 201M, 201C and the developing rollers 302Y, 302M, 302C are driven by separate drive sources. Therefore, the circumferential speed ratios between the developing rollers 302Y, 302M, 302C and the photosensitive drums 201Y, 201M, 201C can be changed regardless of the gear ratio.

(Relationship Between Circumferential Speed Ratio and Toner Amount)

Figure 4A:
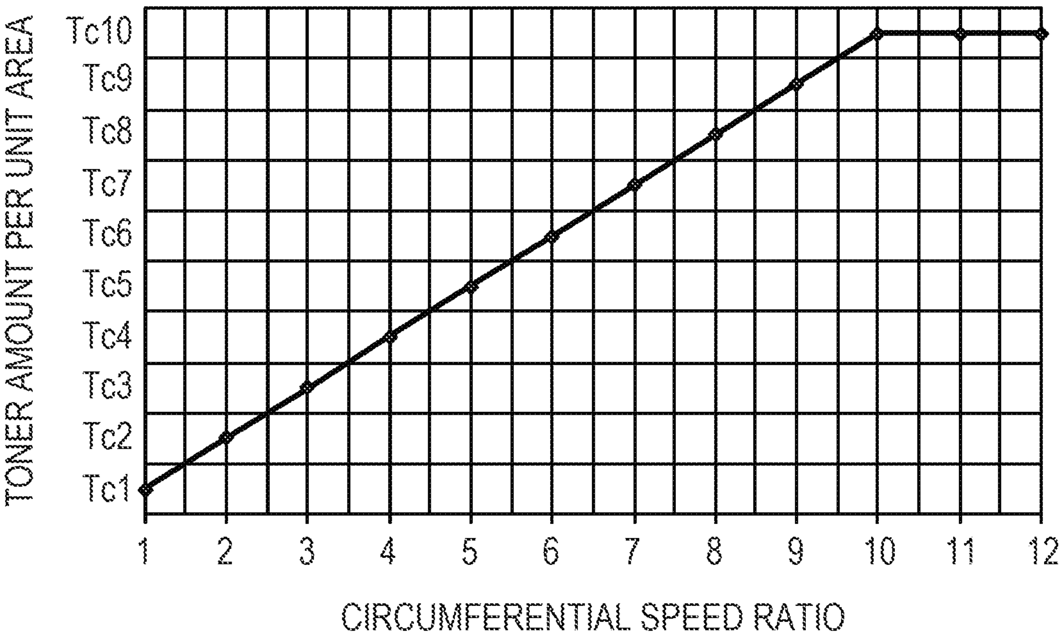
FIG. 4A is a graph for showing a relationship between a circumferential speed ratio and a toner amount per unit area.
Figure 4A:
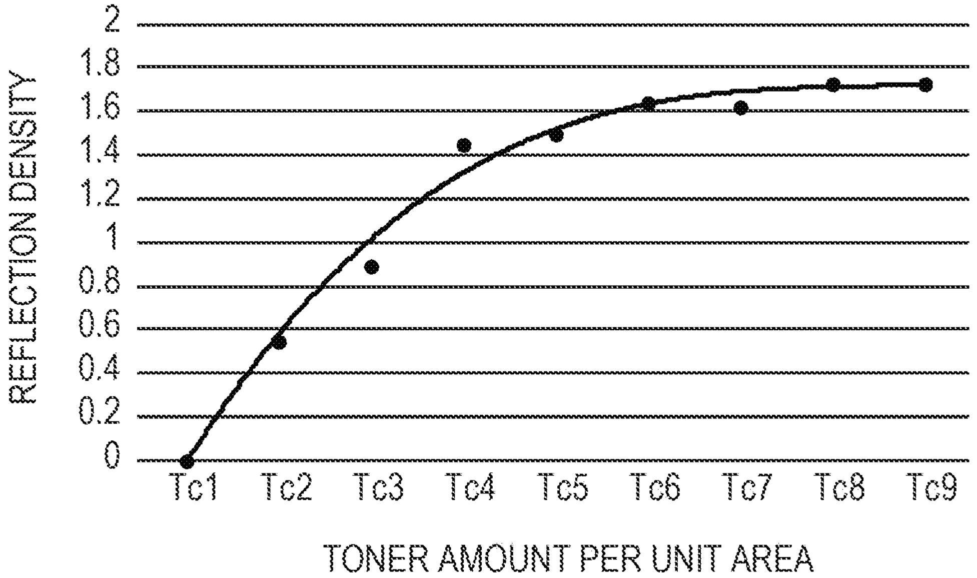

FIG. 4A is a graph for showing a result of measurement of a toner amount per unit area developed on the photosensitive drum 201 when a circumferential speed ratio is changed. The circumferential speed ratio is a ratio of the developing roller 302 to the photosensitive drum 201 in terms of a circumferential speed. In FIG. 4A, a horizontal axis represents the circumferential speed ratio (1, 2, . . . ), and a vertical axis represents the toner amount (Tc1, Tc2, . . . ) per unit area developed on the photosensitive drum 201. The circumferential speed ratios 1, 2, 3, . . . , 12 are referred to as "ratio 1", "ratio 2", "ratio 3", . . . , ratio 12. The potential of the photosensitive drum 201, the developing voltage, the toner charging amount, and the like are appropriately set. As the circumferential speed ratio of the developing roller 302 to the photosensitive drum 201 is increased from the ratio 1, the toner amount to be developed on the photosensitive drum 201, that is, the toner application amount to be moved from the developing roller 302 to the photosensitive drum 201 is also increased from Tc1. The toner amount is saturated at the toner amount Tc 10 with the ratio 10.

FIG. 4B is a graph for showing a relationship between the toner amount per unit area on the recording material 207 and reflection density, which are measured after the toner image developed on the photosensitive drum 201 is transferred to and fixed on the recording material 207. In FIG. 4B, a horizontal axis represents the toner amount (Tc1, Tc2, . . . ) per unit area on the recording material 207, and a vertical axis represents the reflection density (0, 0.2, . . . ). In FIG. 4B, an example of magenta (M) toner among Y, M, C, and K is shown. As the toner amount on the recording material 207 is increased, the reflection density is also increased, and the reflection density is saturated when the toner amount on the recording material 207 is about Tc7.

From the results given above, in the first embodiment, the normal image forming mode and the wide color gamut image forming mode are set as follows. As the normal image forming mode, the reflection density of about 1.45 is sufficient for a general office document or the like. Therefore, the maximum toner amount on the recording material 207 is set to Tc4 for a single color with reference to FIG. 4B, and the circumferential speed ratio between the developing roller 302 and the photosensitive drum 201 is set to the ratio 4 with reference to FIG. 4A. As the wide color gamut image forming mode, for example, the circumferential speed ratio between the developing roller 302 and the photosensitive drum 201 is set to the ratio 10. While the circumferential speed ratio between the developing roller 302 and the photosensitive drum 201 in the normal image forming mode is set to the ratio 4 (maximum toner amount Tc4), the circumferential speed ratio between the developing roller 302 and the photosensitive drum 201 in the wide color gamut image forming mode is increased to the ratio 10 (maximum toner amount Tc10). A unit to increase the maximum toner amount is as follows. When a processing speed in the normal image forming mode is set at 1/1 speed, the processing speed in the wide color gamut image forming mode is set at 1/2 speed. Then, the circumferential speed (the number of rotations) of the photosensitive drum 201 is set to be half of the circumferential speed in the normal image forming mode, and the circumferential speed (the number of rotations) of the developing roller 302 is set to be the same as the circumferential speed in the normal image forming mode. Further, there may be adopted a configuration in which the circumferential speed ratio between the developing roller 302 and the photosensitive drum 201 is increased to the ratio of 10 by increasing the circumferential speed (the number of rotations) of the developing roller 302 by about two times while maintaining the processing speed at 1/1 speed. In this case, a load applied to the drive motor as the driving source of the developing roller 302 is increased, and fixing capability needs to be increased by, for example, increasing a fixing temperature. However, an image forming time can be shortened compared with a case in which the processing speed is set at 1/2 speed. Meanwhile, when the processing speed is set at 1/2 speed, the load applied to the drive motor of the developing roller 302 is not increased, and the toner image can be properly fixed without increasing the fixing temperature. Therefore, in the first embodiment, the processing speed is set to be lowered in the wide color gamut image forming mode.

(Configuration of Control Unit)

Figure 5:
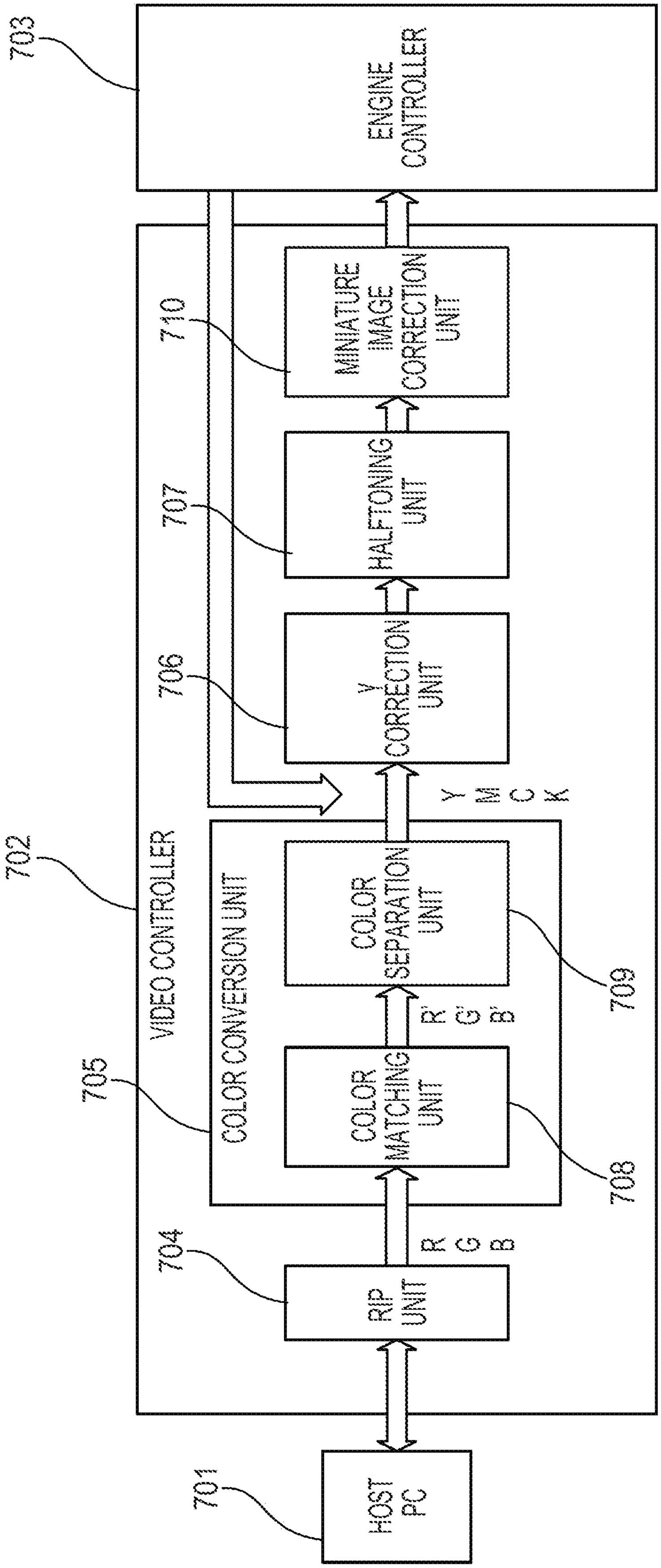
FIG. 5 is a block diagram for illustrating an example of a control unit of the image forming apparatus in the first, second, and fourth embodiments.

FIG. 5 is a block diagram for illustrating an example of a configuration of a control unit of the image forming apparatus 200. From the host PC 701, a print job generally described in page description language (PDL) such as PCL or PostScript is sent to a video controller 702 of the image forming apparatus 200. The video controller 702 as a conversion unit mainly includes a raster image processor (RIP) unit 704, a color conversion unit 705, a gamma correction unit (hereinafter referred to as a γ correction unit) 706, a halftoning unit 707, and a miniature image correction unit 710. The RIP unit 704 performs file-analysis (interpretation) on the print job described in PDL which is sent from the host PC 701, and converts the result into RGB bitmap data in accordance with a resolution (for example, 600 dpi) of the image forming apparatus 200.

The color conversion unit 705 as a conversion unit performs conversion to match hues as much as possible in consideration of differences in color reproducibility ranges between the devices so as to match appearances of colors, and further converts the R, G, and B into each color data of Y, M, C, and K corresponding to the color of the developer (toner). The color conversion unit 705 includes a color matching unit 708, which is configured to match colors between the devices, and a color separation unit 709, which is configured to convert the color-matched color space data into each color toner data of Y, M, C, and K in the image forming apparatus 200.

Generally, a user uses an application (image software, office suite software, or the like) in a computer while viewing a liquid crystal monitor to create an electronic document or the like (hereinafter referred to as "file or the like"). When such a file or the like is printed by the image forming apparatus 200, a color reproducibility range (R', G', and B') of the image forming apparatus 200 is narrower than a color reproducibility range (R, G, and B) of the liquid crystal display. Based on the differences in color gamut between such an input device (an image display device, for example, a liquid crystal monitor) and an output device (an electrophotographic printer, for example), the color matching unit 708 performs a color matching conversion to match hues as much as possible so as to match the appearances of colors. The color separation unit 709 converts the color-matched R', G', and B' by the color matching unit 708 into each color data of Y, M, C, and K of respective developers.

The image data of each color of Y, M, C, and K which has been converted and generated by the color separation unit 709 is subjected to gamma correction by the γ correction unit 706. The image data of each color of Y, M, C, and K which has been subjected to the gamma correction by the γ correction unit 706 is subjected to gradation expression processing, for example, dithering by the halftoning unit 707.

The miniature image correction unit 710 determines whether a character in predetermined points or less or a miniature image in the image data of each Y, M, C, and K processed by the RIP unit 704, the color conversion unit 705, the γ correction unit 706, and the halftoning unit 707 is an image in a predetermined condition. The miniature image correction unit 710 corrects the miniature image to improve visibility obtained when the miniature image is printed by the image forming apparatus 200. As illustrated in FIG. 5, the miniature image correction unit 710 is arranged downstream of the γ correction unit 705 and the halftoning unit 707. That is, the miniature image correction unit 710 determines whether an image about to be output is a correction target image. Therefore, the miniature image correction unit 710 does not erroneously determine that a pixel not originally being a correction target by the miniature image correction unit 710 is the correction target before the processes by the γ correction unit 706 and the halftoning unit 707. The image data subjected to each image processing by the video controller 702 is sent to the engine controller 703 as a signal (hereinafter referred to as "drive signal") (for example, a PWM signal) for driving the laser of the scanner unit 203, which exposes the photosensitive drum 201.

(Outline of Miniature Image Correction)

The first embodiment has a characteristic in that the method of converting image data in the video controller 702 is changed depending on an image forming mode. More specifically, processing methods in the miniature image correction unit 710 are changed depending on the image forming mode. The correction on a miniature image by the miniature image correction unit 710 is hereinafter referred to as "miniature image correction". As an example, in the first embodiment, description is made of a case in which an ON width in the drive signal of the laser is shortened for data (hereinafter referred to as "pixel data") of all pixels forming the miniature image to reduce a toner supply amount. The laser emits light when the drive signal is on, and is turned off when the drive signal is off. Therefore, the ON width in the drive signal is also referred to as "light emission width".

The miniature image correction improves image quality of Y, M, and C for which the circumferential speed between the developing roller 302 and the photosensitive drum 201 can be changed. In the first embodiment, although the processing is described to be applied to Y, M, and C, the processing is not limited thereto. For example, even in K, in a case of an apparatus in which the circumferential speed between the developing roller 302 and the photosensitive drum 201 can be changed regardless of the gear ratio, K may also be subjected to the same processing. Further, the present invention is not limited to the configuration in which the circumferential speed ratio between the developing roller 302 and the photosensitive drum 201 is increased to be in the wide color gamut image forming mode. The same processing is effective for a configuration in which the image forming condition physically acting on the toner movement between the developing roller 302 and the photosensitive drum 201 such as development, exposure and charging voltage (bias) is adjusted, and the developer supplying capability from the developing roller 302 to the photosensitive drum 201 is improved and increased to achieve the wide color gamut image forming mode. Further, when the miniature image correction is performed, the processing is applied to all colors corresponding to the wide color gamut image forming mode. In the present invention, a miniature image refers to a an image such as a fine line, a character having a predetermined size or smaller size, and one or a plurality of isolated point dots, but is not limited thereto. The miniature image also includes, for example, an image in which edges appear frequently and a high-frequency pattern image. For the sake of convenience, in the first embodiment, a character is used for description.

(Image File Example)

Figure 6:
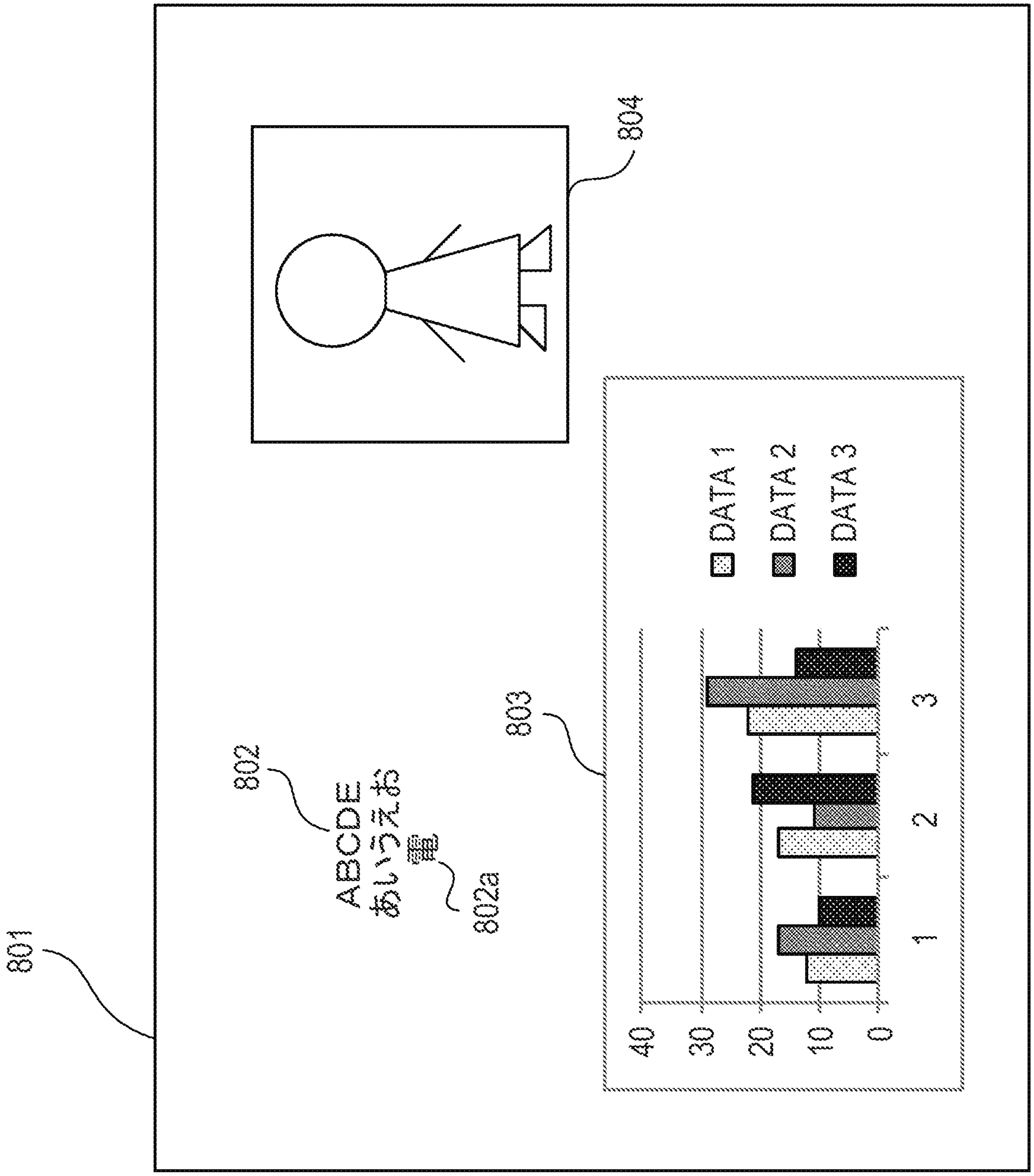
FIG. 6 is an image view for illustrating an example of an image file of the first to fourth embodiments.

FIG. 6 is a view for illustrating an example of an image file in the first embodiment. An image file 801 in FIG. 6 includes a character portion 802, a graphic portion 803, and a photograph portion 804. Pixel data of each pixel forming an image includes a pixel value and attribute information indicating attribute. Character attribute information indicating that the portion corresponds to a character is added to each pixel of the character portion 802. Graphic attribute information indicating that the portion corresponds to a graphic is added to each pixel of the graphic portion 803. Image attribute information indicating that the portion corresponds to an image is added to each pixel of the photograph portion 804. The miniature image correction by the miniature image correction unit 710 in the first embodiment is performed on the character portion 802.

Figure 7A:
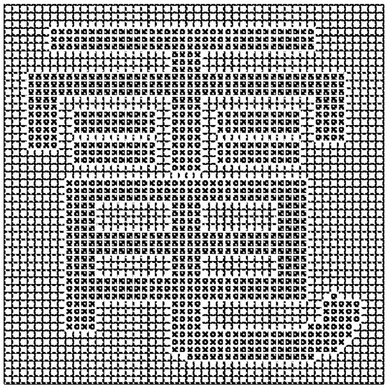
Figure 7B:
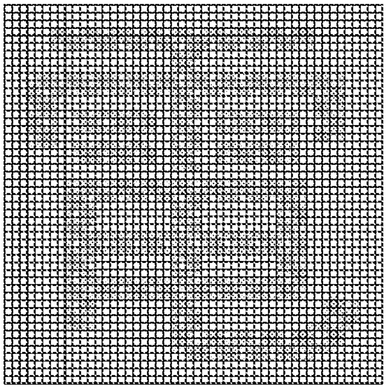
Figure 7B:
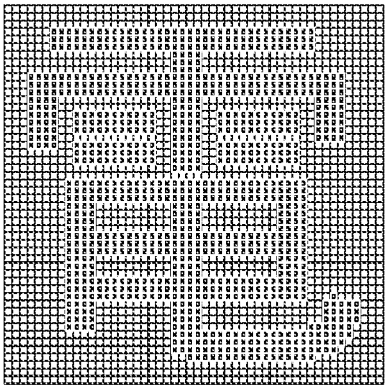
Figure 7D:
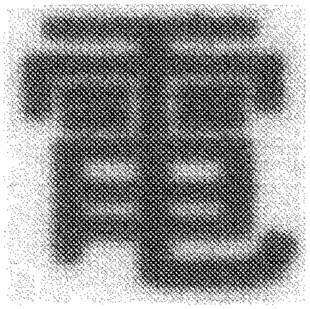
FIG. 7D and FIG. 7E are views for illustrating an output image of the character part.
Figure 7E:
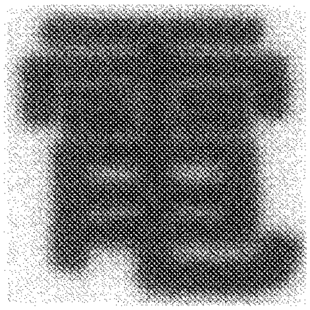

FIG. 7A, FIG. 7B, and FIG. 7C are enlarged views of a character 802*a* (see FIG. 6) which is a part of the character portion 802 as an example of a miniature image. FIG. 7A is an enlarged view of the character 802*a* for illustrating a character 雷 (which is a Japanese character representing "lightning") printed with a 6 pt size in a K (black) plane rendered at a resolution of 600 dpi. Each pixel represented by one square in FIG. 7A has an 8-bit pixel value. In FIG. 7A, white pixels indicate a pixel value of 0 observed when a laser beam L is turned off, and black pixels indicate a pixel value of 255 observed when the laser beam L is turned on. FIG. 7D and FIG. 7E are output image views observed when the character of FIG. 7A is printed. FIG. 7D is an output image view observed when the character of FIG. 7A is printed in the normal image forming mode. Further, FIG. 7E is an output image diagram when the character of FIG. 7A is printed in the wide color gamut image forming mode. When FIG. 7E is compared with FIG. 7D, in FIG. 7E, blur in the character is found as a whole. In the first embodiment, the blur as seen in FIG. 7E is corrected to have approximately the same image quality as the image of FIG. 7D.

FIG. 7B is a view for illustrating a state after the image of FIG. 7A is corrected. The gray pixel of FIG. 7B indicates the pixel value of 192 and the emitted image of the laser beam L. FIG. 7C is a view for illustrating an image of the ON width in the drive signal of the laser corresponding to the pixel value of 192 of FIG. 7B. The drive signal of the laser beam L is emitted at $192/255\times100\%=75\%$ with respect to the case of FIG. 7A ($100\%=255/55\times100\%$). In FIG. 7C, a portion corresponding to 75% of the pixel (one square) is black, and a remaining portion corresponding to 25% is white. Further, a black region is grown from the center of a pixel (one square) toward the right and left. Such a pixel is hereinafter referred to as "central growth pixel". With this, even in the wide color gamut image forming mode, blur in an image is reduced in the miniature image, and an image quality equivalent to the image quality of FIG. 7D can be obtained.

(Detail of Miniature Image Correction)

Figure 8:
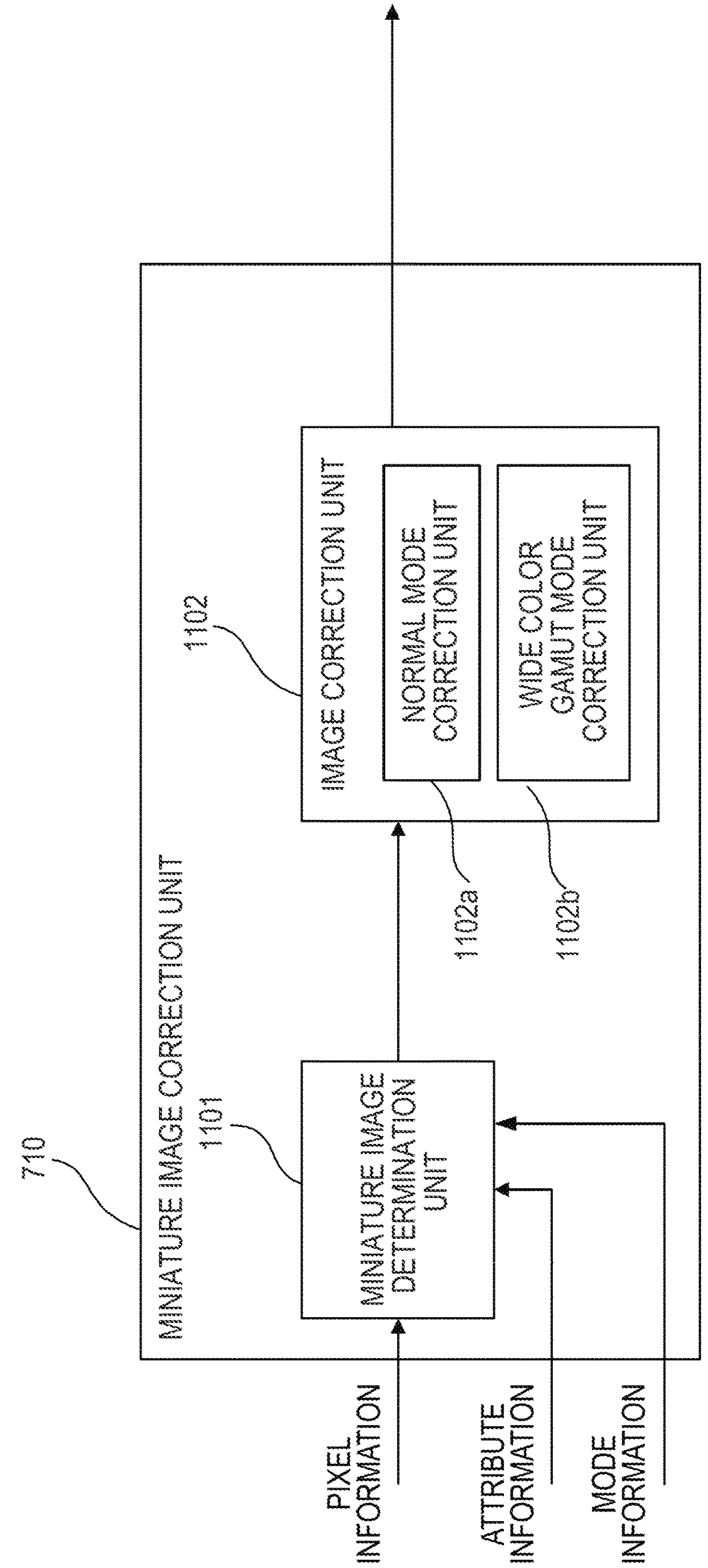
FIG. 8 is a circuit block diagram of a miniature image correction unit in the first embodiment.

Next, a specific processing procedure is described. FIG. 8 is a detailed circuit block diagram of the miniature image correction unit 710. The miniature image correction unit 710 includes a miniature image determination unit 1101, which is a determination unit, and an image correction unit 1102, which is a correction unit. The image correction unit 1102 further includes a normal mode correction unit 1102*a* for the normal image forming mode and a wide color gamut mode correction unit 1102*b* for the wide color gamut image forming mode. The image correction in the wide color gamut image forming mode is different from the image correction for the miniature image in the normal image forming mode. The miniature image determination unit 1101 determines presence or absence of a miniature image based on the input pixel information and the attribute information. When the miniature image is present, the miniature image determination unit 1101 extracts the miniature image. The image correction unit 1102 corrects a pixel which is determined as a miniature image and extracted by the miniature image determination unit 1101. When the pixel extracted in the normal image forming mode is determined as a miniature image, the normal mode correction unit 1102*a* performs image correction for the miniature image. When the pixel extracted in the wide color gamut image forming mode is determined as a miniature image, the wide color gamut mode correction unit 1102*b* performs image correction for the miniature image. For a pixel which is not determined as a miniature image by the miniature image determination unit 1101, the image correction unit 1102 does not perform processing on the input image data and outputs the image data as it is.

Figure 9A:
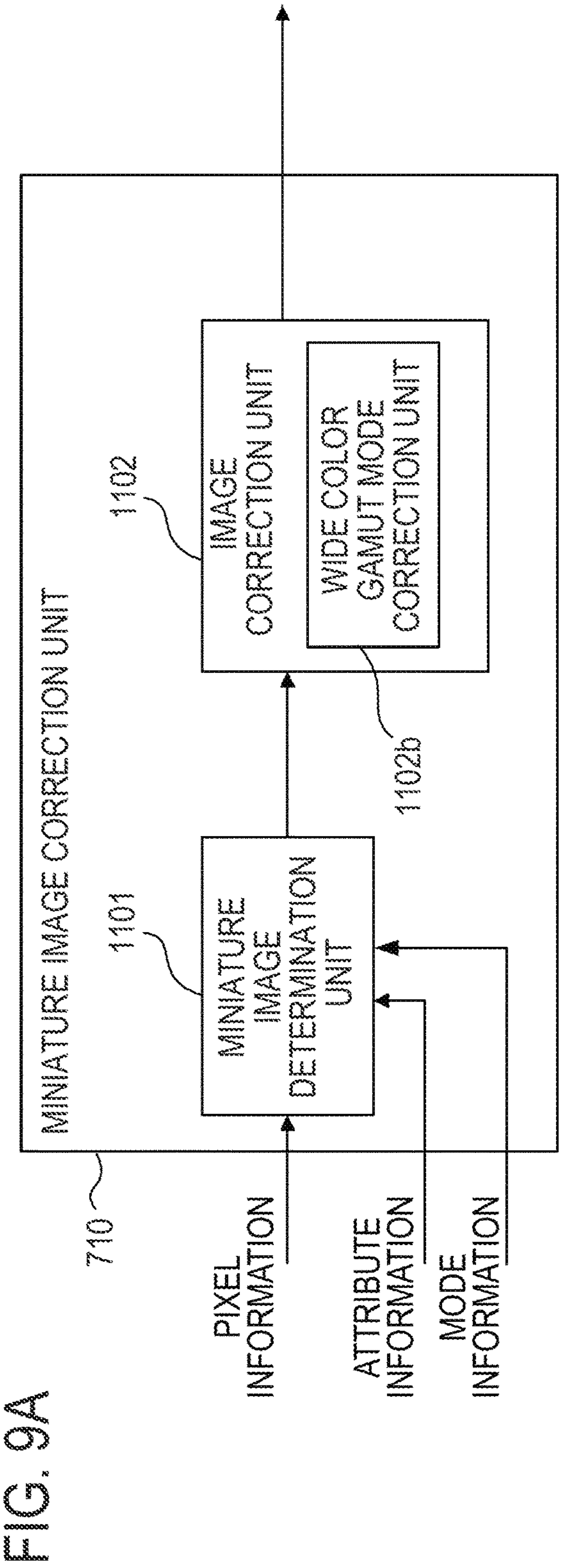
FIG. 9A is another circuit block diagram of the miniature image correction unit in the first embodiment.
Figure 9B:
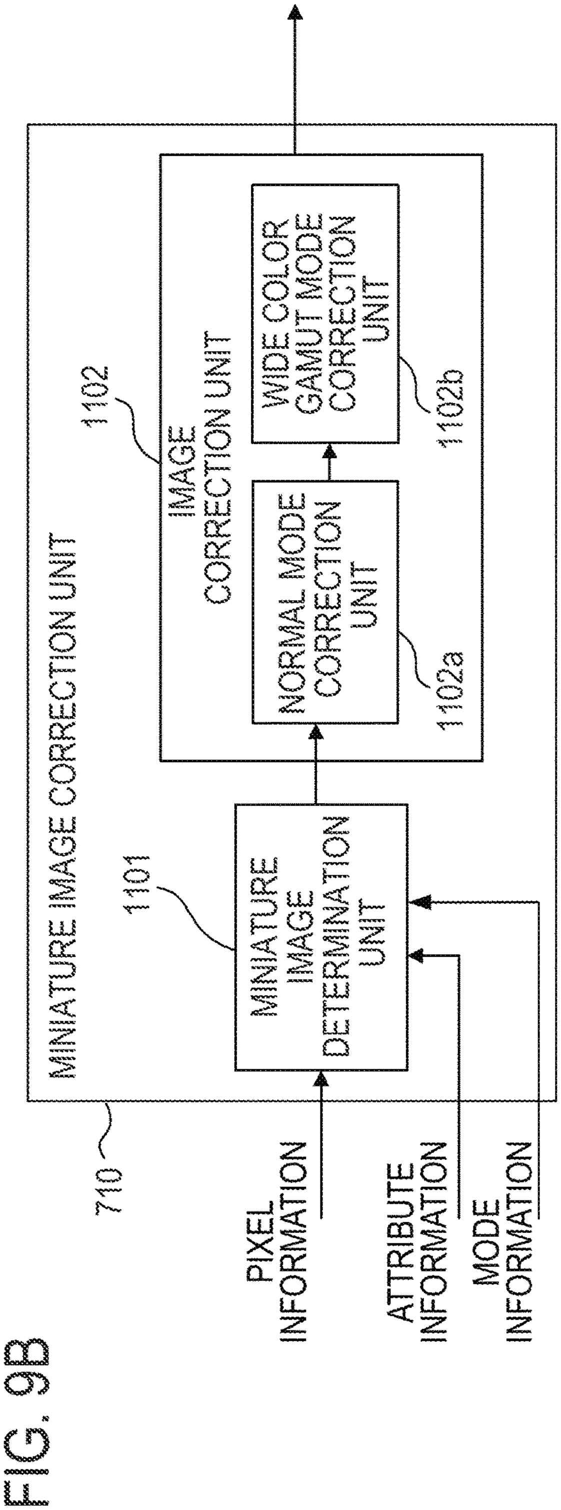
FIG. 9B is still another circuit block diagram of the miniature image correction unit in the first embodiment.

FIG. 9A and FIG. 9B are block diagrams for illustrating modification examples of the image correction unit 1102. In FIG. 9A, illustration is given of a configuration in which no special image processing is performed on a miniature image in the normal image forming mode, and the image correction unit 1102 only includes the wide color gamut mode correction unit 1102*b*. In FIG. 9B, illustration is given of a configuration in which the image correction unit 1102 includes the normal mode correction unit 1102*a* and the wide color gamut mode correction unit 1102*b*. In FIG. 9B, in the configuration in which a miniature image is corrected, the normal mode correction unit 1102*a* performs correction, and then the wide color gamut mode correction unit 1102*b* further performs correction.

Next, a procedure of the processing is described. FIG. 1 is a flowchart of the miniature image correction processing in the first embodiment. In Step S301, the miniature image correction unit 710 receives, for example, 8-bit image data in a raster format (pixel input) subjected to halftone processing by the half toning unit 707. The miniature image correction by the miniature image correction unit 710 is applied to each pixel in raster order. In Step S302, the miniature image determination unit 1101 in the miniature image correction unit 710 determines whether each input pixel is a correction target image.

In the first embodiment, referring to the attribute information of each pixel which is separately sent from each pixel information piece, it is determined whether the pixel is a correction target miniature image based on the attribute information. In Step S302, the miniature image determination unit 1101 determines whether each pixel is a correction target image. For example, when the miniature image determination unit 1101 determines that the attribute information indicates character attribute, and that the character has a predetermined size or smaller size, the pixel is determined as a miniature image, and the processing proceeds to Step S305. The character size to be determined as a correction target by the miniature image correction unit 710 may be, for example, 16 pt. A condition of 1 pt≈0.358 mm is given.

Meanwhile, in Step S302, when the miniature image determination unit 1101 determines that the pixel to be determined is not a correction target image (for example, when the pixel has attribute other than character attribute), the miniature image determination unit 1101 determines that the pixel is not a miniature image, and the processing proceeds to Step S304 without image correction.

In Step S305, the miniature image correction unit 710 determines an image forming mode for printing based on an input mode information. When the normal image forming mode is used for printing, the miniature image correcting unit 710 corrects the image for the normal mode (Step S303*a*). When the wide color gamut image forming mode is used for printing, the miniature image correction unit 710 corrects the image for the wide color gamut mode (Step S303*b*).

In Step S303*a*, the miniature image correction unit 710 performs image correction on the pixel determined as a miniature image by the normal mode correction unit 1102*a* of the image correction unit 1102, and the processing proceeds to Step S304.

Meanwhile, in Step S303*b*, the miniature image correction unit 710 performs image correction on the pixel determined as a miniature image by the wide color gamut mode correction unit 1102*b* of the image correction unit 1102, and the processing proceeds to Step S304.

The correction difference based on the image forming modes is a correction amount. In the normal image forming mode, for example, a value of 90% is set as a correction value, and in the wide color gamut image forming mode, for example, a value of 75% is set as a correction value for a correction target image under the same condition. The miniature image correction unit 710 corrects a pixel forming a thin line so that the character is not blurred. Meanwhile, in the wide color gamut image forming mode, because of the character further being blur, correction including an influence of the wide color gamut image forming mode in addition to the correction in the normal image forming mode is applied to a pixel forming a line.

Further, depending on an image forming condition and an environment, in the normal image forming mode, a line width may need to be widened. In that case, the normal mode correction unit 1102*a* may perform image processing on each pixel to widen the line width forming a miniature image or to increase density. This also applies to each embodiment described later.

In Step S304, the miniature image correction unit 710 determines whether the correction for all pixels has been finished. When the miniature image correction unit 710 determines that the correction has not been finished, the processing returns to Step S301 and the correction processing continues until the processing for all pixels of the input image has been completed. In Step S304, when the miniature image correction unit 710 determines that the correction for all pixels has been finished, the processing ends. Here, although it has been described that only an image having character attribute is corrected, the image correction processing of Step S303 may be also applied to an image having graphic attribute in which a minute miniature pattern, for example, a pattern image is used. With the miniature image correction processing of FIG. 1, it is possible to provide both a photographic image in which a wide color gamut is desired, and a sharp character or a fine line image without blur or the like.

(Correction Parameter)

Next, correction parameters used for the image correction processing of Step S303*a* and Step S303*b* of FIG. 1 are described.

TABLE 1

| | Correction amount [%] |
|---|---|
| Condition 1 | 75 |
| Condition 2 | 50 |
| Condition 3 | 30 |

In Table 1, there is shown an example of the correction parameters indicating the correction amounts in the miniature image correction processing of the first embodiment. In Table 1, conditions (for example, Condition 1) are illustrated in a first column, and correction amounts [%] are illustrated in a second column corresponding to each condition. For example, when Condition 1 is satisfied, 75% is used as the correction amount [%]. The correction amount [%] is a value to be multiplied to a pixel value of each pixel. For example, under Condition 1 a laser beam is emitted with an ON width corresponding to 255×75/100=192 on the black pixel having a pixel value of 255. The pixel value in correspondence with the ON width in the drive signal of the laser is described. However, when a width of one pixel achieved with each resolution is assumed to be a pixel width, the ON width in the drive signal may be referred to as "pixel width". The image correction unit 1102 corrects the miniature image based on the input correction parameter.

In each condition of Table 1, there are indicated a difference in temperature and humidity in a surrounding environment in which the image forming apparatus 200 is installed, a usage status of the image forming apparatus 200 or the process cartridge 208, and the like. For example, Condition 1 indicates high temperature/high humidity (HH). Condition 2 indicates normal temperature/normal humidity (NN). Condition 3 indicates low temperature/low humidity (LL). For example, when an initial condition of the process cartridge 208 is Condition 1, a medium term condition is Condition 2, and a replacement timing condition is Condition 3, the correction amount is changed as the usage is in progress. The purpose of changing the correction amount in accordance with the usage status of the process cartridge 208 is to maintain an appropriate correction effect regardless of the state of the image forming apparatus 200. Further, the condition 1 indicates a (durable) status in which the usage of the process cartridge 208 is in progress with a small potential increase (for example, −500V to −150V) in the electrostatic latent image by the exposure unit. Condition 2 indicates a medium period status. Further, Condition 3 indicates an initial state in which the potential increase in the electrostatic latent image by the exposure unit is small (for example, from −500V to −100V) and a charging contrast decreases.

However, the above description is an example and is not limited thereto. Depending on a specification of the image forming unit of the image forming apparatus 200, the change in line width of the miniature image at the time of endurance or environmental change may be reversed. In that case, Condition 1 may be set as the (durable) state in which the temperature and the humidity are low or the usage of the process cartridge 208 is in progress, and Condition 3 may be set as high temperature and the high humidity or as the initial state in the usage of the process cartridge 208.

The temperature and the humidity in the ambient environment are detected by a detection unit (not shown) which detects the temperature and the humidity of the image forming apparatus 200. Further, the usage status of the process cartridge 208 is determined by the CPU 214 based on information stored in a storage unit (not shown) in the process cartridge 208. The CPU 214 notifies the miniature image correction unit 710 in the video controller 702 of a detection result of the temperature and the humidity by the detection unit or a determination result of the usage status. The miniature image correction unit 710 determines the correction amount based on the detection result of the notified temperature and the humidity and the determination result of the usage status, and based on Table 1. Further, the CPU 214 may refer to Table 1 to determine the correction amount, and may notify the miniature image correction unit 710 of the determined correction amount.

In the first embodiment, the image having a pixel value of 255 after the halftone processing by the halftoning unit 707 is described with regard to the miniature image, but the ON width in the drive signal of the laser is corrected in the same manner even for, for example, images having other than the pixel value of 255 after the halftone processing. Further, in the first embodiment, the processing after the halftone processing is described, but a configuration of performing the miniature image determination, for example, before or after the color conversion or after the γ conversion may be adopted. Further, in the first embodiment, the method of correcting the pixel value of the miniature pixel by adjusting the ON width in the drive signal of the laser is described. However, for example, a configuration in which the correction is achieved by γ correction using a γ table may be adopted.

The correction parameters of Table 1 are stored in a memory (not shown). The memory in this case includes, for example, all of or any one of memories (not shown) in the image forming apparatus 200, a memory (not shown) of the developing unit 204 in the process cartridge 208, and a memory (not shown) of the photosensitive member unit 301 in the process cartridge 208. Further, at this time, a correction parameter for each device or unit is stored in each memory, and new correction parameters may be calculated by the CPU 214 of the engine controller 703 based on the correction parameters read out from all of or any one of the memories.

In the first embodiment, description is made of the configuration of performing the miniature image correction when the image is formed in the wide color gamut image forming mode. The correction is not limited thereto, and, for example, when the same processing is to be performed in the normal image forming mode, the following configuration may be adopted. For example, in addition to the correction amount in the miniature image correction at the time of the normal image forming mode, the correction may be performed with an increased correction amount of the supplied toner amount in the wide color gamut image forming mode to obtain a more suitable image. Thus, in the first embodiment, the image quality of the miniature image is improved by correcting the light emission width in the laser with respect to the pixel value of the pixel determined as the miniature image having the character attribute or the graphic attribute. The correction is not limited thereto, and the same processing may be applied to an image in which, for example, isolated points are densely formed or an image pattern used for a background pattern. The density of the isolated points and the background pattern may be detected by the miniature image correction unit 710 with a well-known method.

As described above, according to the first embodiment, when the image forming operation is performed to increase a toner application amount per unit area on the recording material as compared to a usual amount, deterioration in image quality due to blur in an image or scattering can be suppressed.

Second Embodiment

An image forming apparatus according to a second embodiment of the present invention is described. In the second embodiment, the same reference symbols as those given in the first embodiment are used for the components common to the first embodiment, and the description thereof is omitted. In the first embodiment, the image is corrected for all pixels having the character attribute or the graphic attribute. In the second embodiment, regardless of the image attribute information, edge portions of a miniature image as a correction target are processed. In the second embodiment, a miniature image is extracted by the miniature image determination unit 1101 from an image containing a character in the predetermined point or less described in the first embodiment.

(Miniature Image Determination Method)

Figures 10A, 10B, 10C, 10D:
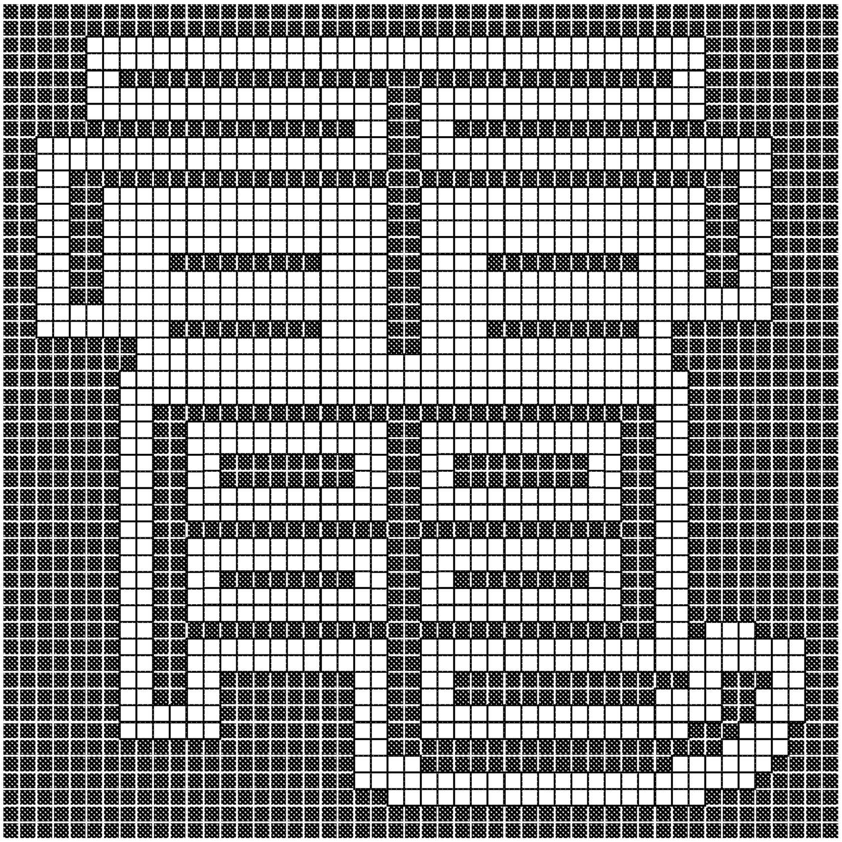
FIG. 10A, FIG. 10B, and FIG. 10C are views for illustrating examples of an edge detection filter in the second embodiment.
FIG. 10D is a view for illustrating a result of edge detection.

FIG. 10A, FIG. 10B, and FIG. 10C are explanatory views for illustrating a miniature image determination method of the miniature image determination unit 1101 in the second embodiment. FIG. 10A, FIG. 10B, and FIG. 10C are examples of known edge detection filters. In FIG. 10A and FIG. 10B, examples of a Sobel filter are illustrated, and, in FIG. 10C, an example of a Laplacian filter is illustrated. In the second embodiment, edge portions of an image are detected by, for example, the edge detection filters of FIG. 10A, FIG. 10B, and FIG. 10C. On this occasion, it is desired that the isolated dots formed by the halftoning processing and the edge portions of the line screen be excluded.

In FIG. 10D, there is illustrated a result of the edge portions detected by the edge detection filters of FIG. 10A, FIG. 10 B, and FIG. 10C for the image data of FIG. 7A. Black pixels indicate non-edge portions, and white pixels indicate the edge portions. In the second embodiment, the white pixels being the edge portions, which are extracted by the edge detection filter, are corrected. As described above, in FIG. 10A, FIG. 10B, and FIG. 10C, the Sobel filter and the Laplacian filter as edge detection filters are illustrated, but the filter is not limited thereto. For example, a Prewitt filter or any processing to detect edges, for example, pattern matching processing may be used.

When the number of pixels determined as the edge portions is equal to or larger than the predetermined number in a predetermined size area (for example, 100 pixels×100 pixels), the miniature image determination unit 1101 can determine a target image as a miniature image. Further, the miniature image determination unit 1101 may determine whether the target pixel is a miniature image based on the character attribute and the size of the character as in the first embodiment.

Figure 11A:
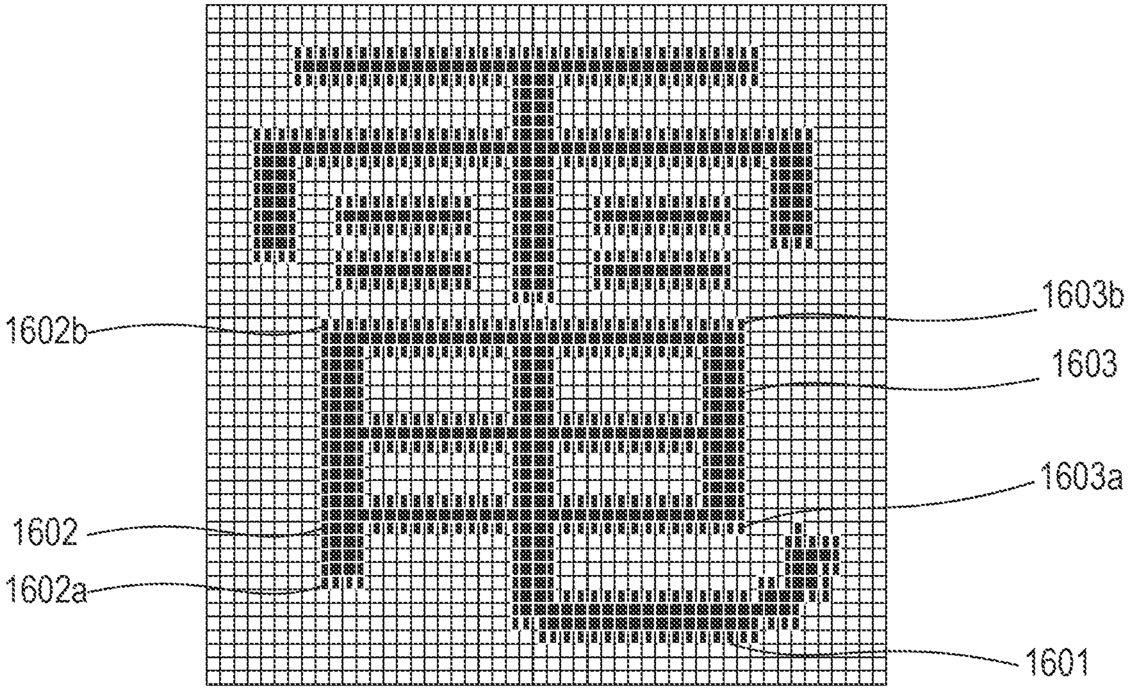
FIG. 11A is a view for illustrating an example of an image correction method of the miniature image correction unit in the second embodiment.
Figure 11A:
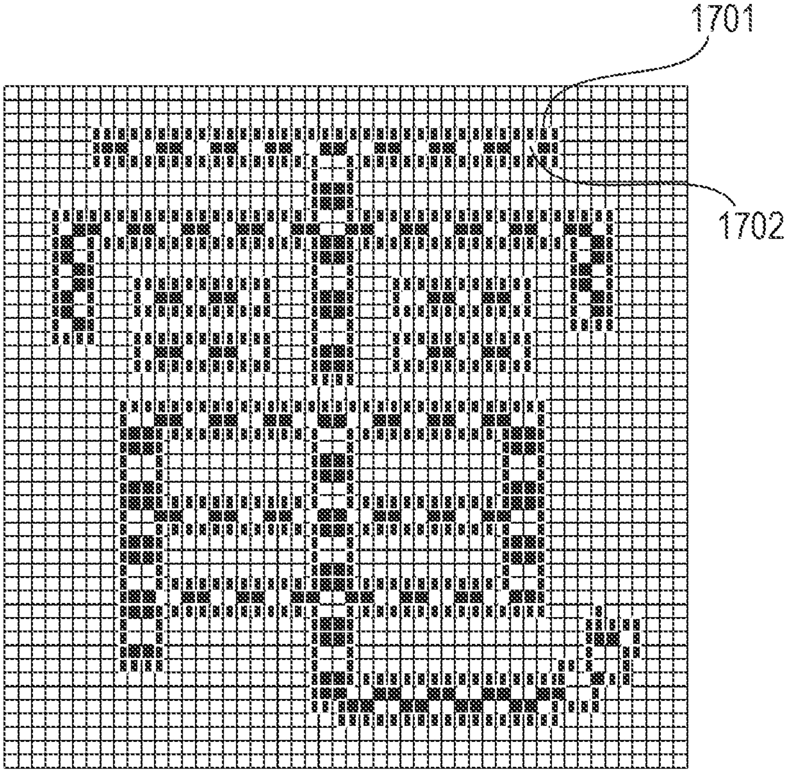

In FIG. 11A, there is illustrated an example of an image correction method of the image correction unit 1102 (wide color gamut mode correction unit 1102*b*) in the miniature image correction unit 710 in the second embodiment. In the second embodiment, the light emission width in the laser is set shorter than the original light emission width so as to lower irradiation intensity of the laser to all pixels of the edge portions forming the detected character 802*a*. Further, when the correction is performed, the pixels determined as edge portions are classified as follows, and start timing of light emission of the laser in one pixel is changed depending on the classification.

For pixels determined as edge portions positioned on the left side of the black pixels forming the character 802*a*, similarly to the correction pixel 1602, the laser emits light such that the emission timing is on the right side of the pixels by shifting the light emission timing. A pixel in which a black region grows from the right end to the left side of the pixel is hereinafter referred to as "left growth pixel. The black pixels here refer to the black pixels forming the character 802*a* as the character 雷 (which is the Japanese character representing "lightning") among the black pixels determined as non-edge portions in FIG. 10D. Further, even for the edge portions which are not on the left side of the black pixels as the correction pixels 1602*a* and 1602*b*, when the edge portions are pixels continuous to the correction pixels 1602 on the left side of the black pixels in a sub-scanning direction, the laser is emitted to form left growth pixels similarly to the correction pixels 1602.

For pixels determined as edge portions positioned on the right side of the black pixels forming the character 802*a*, similarly to the correction pixel 1603, the laser emits light such that the emission timing is on the left side of the pixels. A pixel in which a black region grows from the left end to the right side of the pixel is hereinafter referred to as "right growth pixel". Further, even for the edge portions which are not on the right side of the black pixels of FIG. 10D as the correction pixels 1603*a* and 1603*b*, when the edge portions are pixels continuous to the correction pixels 1603 on the right side of the black pixels in the sub-scanning direction, the laser is emitted to form right growth pixels as the correction pixels 1603. For edge portions which have no adjacent black pixels in the main scanning direction and are continuous in the sub-scanning direction of the black pixels forming the character 802*a*, the laser emits light to make central growth pixels in which the center of each pixel width and the center of the light emission width match with each other as the correction pixel 1601. Thus, the start timing of light emission when the laser emits light with the ON width in the drive signal is changed based on a positional relationship with the pixels which do not form the edge portions. Thus, it is possible to suppress a decrease in density and blur in an image, and to improve image quality of a miniature image.

In addition, in the above description, light is emitted to the pixels to be corrected such that the center of each pixel is corrected for the edge portion of the black pixel in the sub-scanning direction, and the light emission width is continuous to the black pixel for the edge portions at the right and the left. However, any method may be applied in which light is emitted to all pixels to be corrected from the center, from left to right, or from right to left, or a combination thereof. Further, in the second embodiment, the correction method is described, in which the light emission width in the laser beam is adjusted for image correction. However, for example, a configuration may be adopted in which the correction may be achieved by $\gamma$ correction using the $\gamma$ table.

Further, in the second embodiment, description is made of a case in which the image correction unit 1102 (wide color gamut mode correction unit 1102*b*) corrects the edge portions, but the image correction unit 1102 is not limited thereto. The extracted miniature image by the extraction method of a target pixel to be corrected described in the second embodiment may be subjected to the image correction described in Step S303 of the first embodiment by the image correction unit 1102 (the wide color gamut mode correction unit 1102*b*).

As described above, according to the second embodiment, when the image forming operation is performed to increase a toner application amount per unit area on the recording material more than usual, deterioration in image quality due to blur in an image or scattering can be suppressed.

Third Embodiment

An image forming apparatus according to a third embodiment of the present invention is described. In the third embodiment, the same reference symbols as those given in the first and second embodiments denote the elements common to the first and second embodiments, and the description thereof is omitted. The elements which are not to be described in the third embodiment are the same as the elements in the first and the second embodiments. In the first and the second embodiments, as the miniature image correction, the entire pixels or only the edge portions of the miniature image are corrected. Meanwhile, in the third embodiment, correction of the edge portions is differentiated from correction of the non-edge portions. Therefore, a criterion as to whether the image is to be a correction target image is the same as the criterion used in the second embodiment.

(Miniature Image Correction Method)

In FIG. 11B, there is illustrated an example of the image correction method by the image correction unit 1102 of the miniature image correction unit 710 of the third embodiment. In FIG. 11B, with respect to the edge portions, image processing is performed to reduce the exposure amount of the laser on all pixels determined as the edge portions as in the second embodiment. Meanwhile, with respect to the non-edge portions, γ correction is applied to reduce the density, and then, the halftoning processing is performed. For example, the miniature image correction unit 1002 corrects a pixel 1701 determined as an edge portion in the same manner as described in the second embodiment. Meanwhile, the γ correction unit 706 perform γ correction on a pixel 1702 determined as a non-edge portion to reduce the density. The miniature image determination unit 1001 of the third embodiment has the same edge detection function as the miniature image determination unit 1101 of the second embodiment.

(Configuration of Control Unit)

Figure 12A:
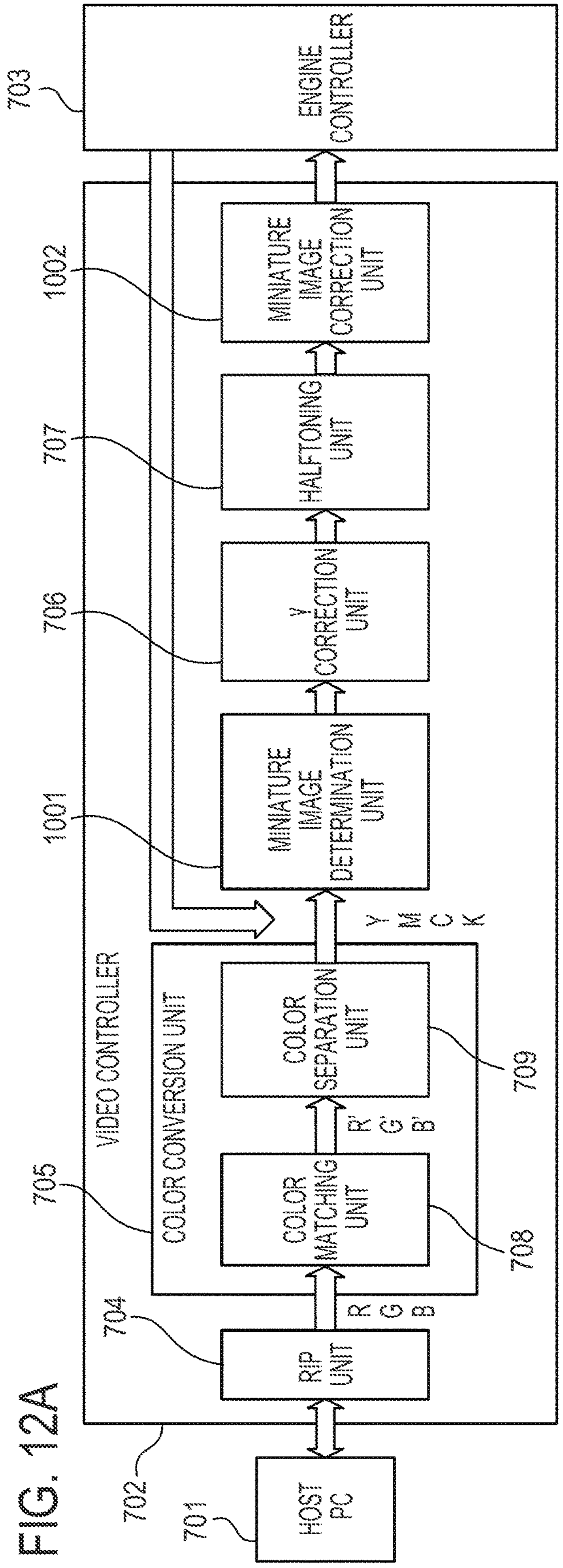
FIG. 12A is a block diagram for illustrating an example in a configuration of a control unit of an image forming apparatus according to the third embodiment.

FIG. 12A is a block diagram for illustrating an example of a configuration of the video controller 702 in the image forming apparatus 200 according to the third embodiment. The difference of FIG. 12A from FIG. 5 is that, the miniature image determination unit 1101 in the miniature image correction unit 710 of FIG. 5 is arranged between the color conversion unit 705 and the γ correction unit 706 as the miniature image determination unit 1001 in the third embodiment. In the third embodiment, miniature image determination is performed by the miniature image determination unit 1001 before the processing by the γ correction unit 706. After the edge portions are subjected to the γ correction, the halftoning is not applied and the miniature image correction by the miniature image correction unit 1002 is performed. The non-edge portions are subjected to the γ correction for the miniature image, and the halftoning is applied thereto.

For example, as illustrated in FIG. 11B, in the wide color gamut image forming mode, γ correction for the miniature image is applied to the black pixels which form the character 802*a* determined as non-edge portions by the miniature image determination unit 1001, and the halftoning is performed. As a result, the density is reduced as a whole by providing pixels on which the laser is not emitted as the pixel 1702. A configuration in which the correction amount of Table 1 is multiplied so as to reduce the density may be used instead of the configuration in which the laser is not emitted on the pixel 1702 determined as a non-edge portion.

Figure 12B:
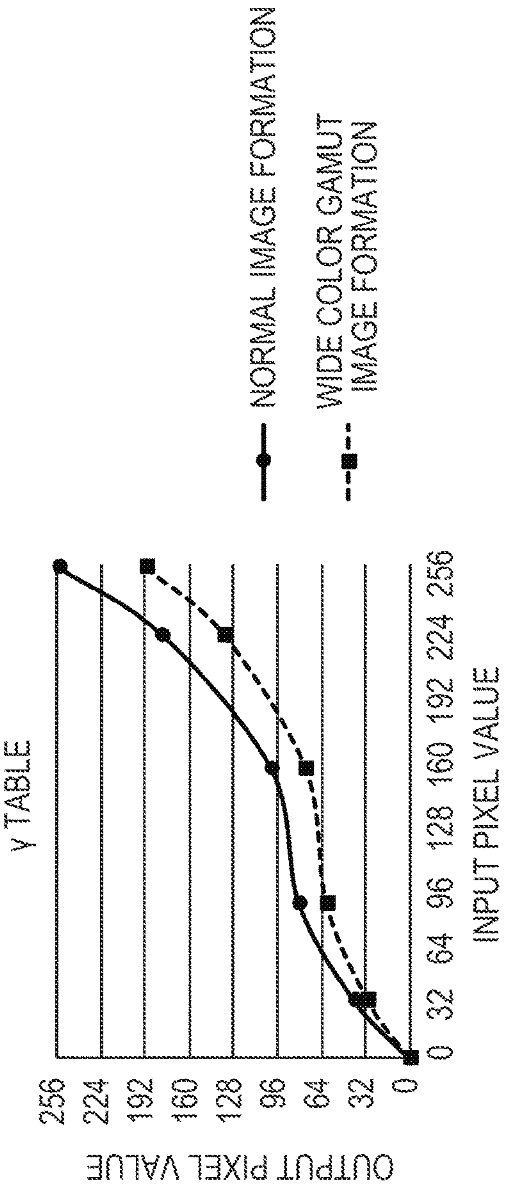
FIG. 12B is a graph for showing an example of a γ table.

With reference to FIG. 12B, the γ correction method of the third embodiment by the γ correction unit 706 is described. In FIG. 12B, the horizontal axis represents input pixel values (32, 64, for example), and the vertical axis represents output pixel values (32, 64, for example), that is, the γ table (γ curve) is illustrated. Further, the γ table for the normal image formation used for a first γ correction is indicated by a solid line, and the γ table for the wide color gamut image formation used for a second γ correction is indicated by a broken line. The γ table for the normal image formation of FIG. 12B is an example of a γ table in which the density is uniformly output when the image printed in the normal image forming mode. The γ correction unit 706 performs correction by the γ table of the normal image forming mode at the time of printing in the normal image forming mode and at the time of printing other than the miniature image when the image is printed in the wide color gamut image forming mode. Meanwhile, the γ table for the wide color gamut image formation is an example of a γ table with which a miniature image when printed in the wide area image forming mode can suitably output. The γ table for the wide color gamut image formation is a table in which an output pixel value is smaller than an output pixel value of the γ table for the normal image formation for the same input pixel value and the density is reduced. The γ correction unit 706 performs γ correction through use of the γ table for the wide color gamut image forming mode on a miniature image (non-edge portions) when printed in the wide color gamut image forming mode.

In the third embodiment, the method has been described, in which, when the image is determined as the miniature image, the exposure amount of the laser for all pixels is corrected for the edge portions, γ correction for the wide color gamut image formation is applied to the non-edge portions, and the halftoning is applied. However, the correction is not limited thereto, and, for example, γ correction of different γ tables may be applied to both the non-edge portions and the edge portions and the halftoning is applied, or the exposure amount of the laser on all pixels may be corrected with different correction amounts for both the non-edge portions and the edge portions.

As described above, according to the third embodiment, when the image forming operation is performed to increase a toner application amount per unit area on the recording material more than usual, deterioration in image quality due to blur in an image or scattering can be suppressed.

Fourth Embodiment

An image forming apparatus 200 according to a fourth embodiment of the present invention is described. In the fourth embodiment, the same reference symbols as those given in the first, second, and third embodiments denote the elements common to the first, second, and third embodiments, and the description thereof is omitted. The elements which are not to be described in the fourth embodiment are the same as the elements in the first, the second, and the third embodiments. The fourth embodiment relates to, in particular, a method of correcting a line image.

(Method of Correcting Line Image)

Figure 13A:
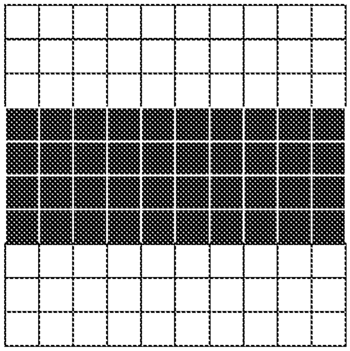
FIG. 13A and FIG. 13B are image views for illustrating examples of line images of the fourth embodiment.
Figure 13B:
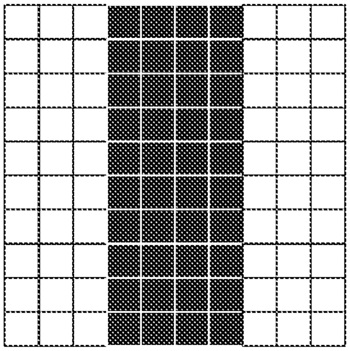

In FIG. 13A and FIG. 13B, line images having a line width of 4 dots and rendered at 600 dpi are illustrated. FIG. 13A is an enlarged view of a horizontal line (line extending in the main scanning direction), and FIG. 13B is an enlarged view of a vertical line (line extending in the sub-scanning direction). In Table 2A and Table 2B, there are shown examples of measurement results of the line widths of FIG. 13A and FIG. 13B, respectively. In Table 2A, the line widths of FIG. 13A and FIG. 13B in the normal image forming mode are shown, and in Table 2B, the line widths of FIG. 13A and FIG. 13B in the wide color gamut image forming mode are shown. In Table 2A and Table 2B, there are shown ideal widths [μm] of the line widths and measured widths [μm] of the vertical line or the horizontal line. The ideal widths of the line widths are 169.3 μm for both the normal image forming mode and the wide color gamut image forming mode.

TABLE 2A

| | Measured width [μm] | |
|---|---|---|
| Ideal width [μm] | Vertical line | Horizontal line |
| 169.3 | 209.6 | 218.1 |

TABLE 2B

| | Measured width [μm] | |
|---|---|---|
| Ideal width [μm] | Vertical line | Horizontal line |
| 169.3 | 251.1 | 262.9 |

Referring to the measurement results shown in Table 2A and Table 2B, the line widths of the vertical line and the horizontal line in the wide color gamut image forming mode are larger than the line widths in the normal image forming mode by 40 μm or more. When the vertical line is compared with the horizontal line, the horizontal line is thicker than the vertical line in each image forming mode, but an increase in width of the horizontal line with respect to the vertical line in the wide color gamut image forming mode is larger than an increase in width in the normal image forming mode. The toner is used more in the wide color gamut image forming mode than in the normal image forming mode, and hence the width of the line image is increased. Because the circumferential speed ratio between the developing roller 302 and the photosensitive drum 201 is increased, the increase in width of the horizontal line is larger as compared with the increase in width of the vertical line. In the fourth embodiment, correction is performed in accordance with the features of the wide color gamut image forming mode. That is, the miniature image determination unit 1101 can extract or determine such a character having a predetermined size or small size and the miniature image as described in the first to the third embodiments, and further can determine the fine line.

Figure 13C:
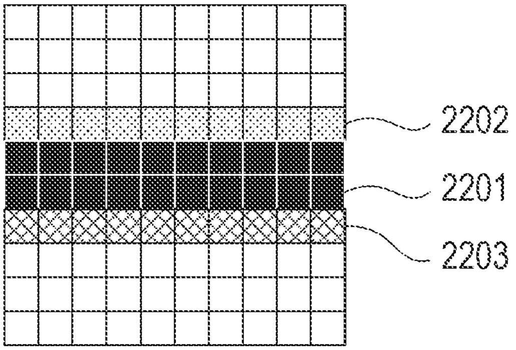
FIG. 13C, FIG. 13D, FIG. 13E, and FIG. 13F are explanatory views for illustrating the image correction method.
Figure 13D:
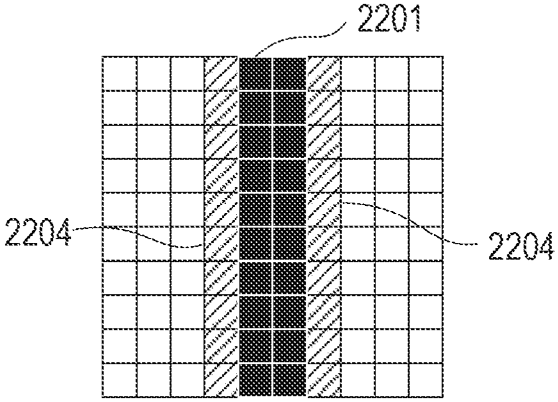

FIG. 13C, FIG. 13D, FIG. 13E, and FIG. 13F are explanatory views for illustrating correction methods of the image correction unit 1102 in the fourth embodiment. FIG. 13C is a view for illustrating correction points in the horizontal line. FIG. 13D is a diagram for illustrating correction points in the vertical line. The miniature image determination unit 1101 detects four areas including a non-edge portion 2201, an upper edge portion 2202, a lower edge portion 2203, and a left and right edge portion 2204 by the method described in the second embodiment, and determines a miniature image. Here, a method of detecting the horizontal line and the vertical line is described. In the detection of the horizontal line and the vertical line, the vertical line and the horizontal line are detected based on a relationship between the number of continuous dots in a direction along the rotation direction of the developing roller and the number of continuous dots in a direction (longitudinal direction of the developing roller) orthogonal to the rotation direction of the developing roller, respectively. When the number of continuous dots in the direction along the rotation direction of the developing roller is smaller than the number of continuous dots in the direction orthogonal to the rotation direction of the developing roller, the line is detected as a horizontal line. In contrast, when the number of continuous dots in the direction orthogonal to the rotation direction of the developing roller is smaller than the number of continuous dots in the direction along the rotation direction of the developing roller, the line is detected as a vertical line. However, when the number of dots in the direction along the rotation direction of the developing roller and the number of dots in the direction orthogonal to the rotation direction of the developing roller are both sufficiently large, that is, when the number of dots is larger than a predetermined number of dots, the line is not recognized as a line image. In view of this, for example, the horizontal line is detected by the miniature image determination unit 1101, when the black pixels are detected as being continuous, for example, in 4 dots or less in the direction along the rotation direction of the developing roller, and are detected as being continuous in a predetermined number of dots in the direction orthogonal to the rotation direction of the developing roller. Similarly, the vertical line is detected, when the black pixels are detected as being continuous in 4 dots or less in the direction orthogonal to the rotation direction of the developing roller, and are detected as being continuous in a predetermined number of dots along the rotation direction of the developing roller.

Figure 13E:
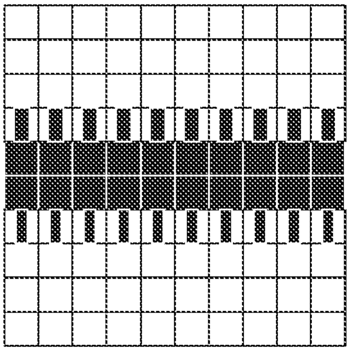
Figure 13F:
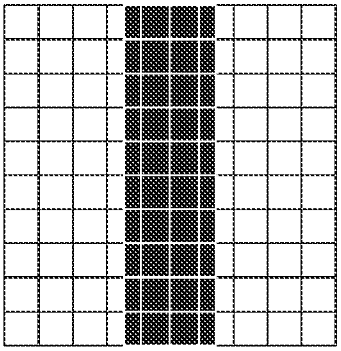

FIG. 13E and FIG. 13F are views for illustrating examples in which the line images of FIG. 13A and FIG. 13B are corrected by the correction method by the image correction unit 1102, respectively. As illustrated in FIG. 13E, the image correction unit 1102 performs correction so that the center of each pixel matches the center of the light emission width of the laser in the upper edge portion 2202 and the lower edge portion 2203 of the horizontal line, that is, so that the pixels are turned to be central growth pixels. As illustrated in FIG. 13F, with respect to the vertical line, the start timing of light emission for the right and left edge portions 2204 is corrected so as to be adjacent to the non-edge portion 2201.

(Correction Parameter)

Table 3 is a table for showing an example of correction parameters of the image correction unit 1102 in the fourth embodiment. The correction parameters shown in Table 3 are stored in the apparatus in a state in which the correction parameters can be referred to by the image correction unit 1102. In the fourth embodiment, the image is corrected so as to be equivalent to the vertical line width and the horizontal line width in the normal image forming mode. From Table 2A and Table 2B, the vertical line is corrected to be thinner by 41.5 (=251.1−209.6) μm and the horizontal line is corrected to be thinner by 42.8 (=262.9−218.1) μm.

TABLE 3

| Upper edge portion | Lower edge portion | Right and left edge portion |
|---|---|---|
| 45% | 35% | 50% |

In the example of Table 3, the upper edge portion 2202 is corrected by such a correction amount as to have a pixel width of 45%. The lower edge portion 2203 is corrected by such a correction amount as to have a width of 35%. The right and left edge portion 2204 is corrected by such a correction amount as to have a pixel width of 50%. Accordingly, even when a line image is formed in the wide color gamut image forming mode, a line width equivalent to a line width of a line image formed in the normal image forming mode can be achieved, and the image quality becomes appropriate. Further, the correction parameters of the vertical line and the horizontal line are different so that the vertical line can have approximately the same thickness as the horizontal line.

An oblique line can be regarded as a line in which a vertical line is mixed with a horizontal line. Therefore, for example, the correction parameters of the vertical line and the horizontal line are weighted-averaged by an oblique line angle for correction. When the angle increases counterclockwise with the angle of the horizontal line being 0 degrees and the angle of the vertical line being 90 degrees, a correction amount may be, for example, obtained by the following expressions.

Correction parameter 1=(upper edge correction amount×(1−angle/90)+right and left edge correction amount×angle/90)/2

Correction parameter 2=(lower edge correction amount×(1−angle/90)+right and left edge correction amount×angle/90)/2

The difference between the correction parameter 1 and the correction parameter 2 is which an upper edge correction amount or a lower edge correction amount is used. For an oblique line having degrees less than 90 degrees, the correction parameter 2 is used for correcting the lower edge, and the correction parameter 1 is used for correcting the upper edge. For example, when an oblique line inclined by 30 degrees is corrected using the correction parameter of Table 3, the correction amount of the upper edge portion is Correction parameter 1=(45%×(1−30/90)/90+50%×30/90)/2≈46.7%. The correction amount of the lower edge portion is Correction parameter 2=(35%×(1−30/90)+50%×30/90)/2≈40.0%. Through those corrections, with respect to the oblique line, the vertical line can have approximately the same thickness as the horizontal line.

In the first to third embodiments, it has been described that the wide color gamut mode correction unit 1101*b* corrects a character having a predetermined size or less and pixels of an image extracted from a miniature image, but the correction is not limited thereto. For example, the wide color gamut mode correction unit 1102*b* may correct, in the manner described in the first to third embodiments, the horizontal line and the vertical line extracted by the miniature image determination unit 1101 described in the fourth embodiment. That is, the miniature image determination unit 1101 may serve as a determination unit which determines whether the input image is an image under a predetermined condition, which is a fine line having a predetermined width or less, a miniature image or a character having a predetermined points or less. Further, the wide color gamut mode correction unit 1102*b* may have various correction processing functions.

As described above, according to the fourth embodiment, when an image forming operation is performed in which a toner application amount per unit area on the recording material is increased more than usual deterioration in image quality due to blur in a character having a predetermined size or less, a miniature image and a fine line image having a predetermined width or smaller size, and scattering can be suppressed.

Other Embodiments

The present invention can be achieved by processing in which a program implementing one or more functions of the above-mentioned embodiments is supplied to a system or an apparatus via a network or storage medium, and one or more processors in a computer of the system or the apparatus read and execute the program. Further, the processing can be achieved by a circuit (for example, ASIC) which implements one or more functions.

As described above, according to other embodiments, when the image forming operation is performed to increase a toner application amount per unit area on the recording material more than usual, deterioration in image quality due to blur in an image or scattering can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-022878, filed Feb. 13, 2018, which is hereby incorporated by reference herein in its entirety.

What is claimed is:

1. An image forming apparatus comprising:

an exposure unit configured to emit light according to a drive signal corresponding to input image data;

an image bearing member on which an electrostatic latent image is formed by an exposure of the exposure unit;

a developer carrying member configured to develop the electrostatic latent image on the image bearing member with a developer, the image forming apparatus being configured to form a toner image in a first mode and in a second mode in which the image forming apparatus is operated under an image forming condition in which developer supplying capability from the developer carrying member to the image bearing member is increased to form the toner image;

a determination unit configured to determine whether an input image is a predetermined condition image in a predetermined condition in which the input image is a fine line having a predetermined width or less, a miniature image, or a character having predetermined points or less; and a correction unit configured to set a line width thin or lighten density for the predetermined condition image at a time of forming the toner image in the second mode, wherein the correction unit is configured to determine a correction amount so that a width of the drive signal set for the predetermined condition image in the second mode, which causes the exposure unit to emit light to a pixel forming the predetermined condition image, is gotten shorter than the width of the drive signal set for the predetermined condition image in the first mode.

2. An image forming apparatus according to claim 1, further comprising a process cartridge including at least the image bearing member, wherein the correction unit is configured to determine the correction amount based on temperature and humidity in an environment in which the image forming apparatus is installed, or based on a usage status of the process cartridge.

3. An image forming apparatus according to claim 1, further comprising a gamma correction unit configured to perform gamma correction, wherein the determination unit is configured to determine whether image data subjected to the gamma correction by the gamma correction unit is the predetermined condition image.

4. An image forming apparatus according to claim 1, further comprising a gamma correction unit configured to perform a first gamma correction used in the first mode and a second gamma correction set to lower the density than the first gamma correction, wherein the determination unit is configured to determine whether image data before the gamma correction is performed by the gamma correction unit is the predetermined condition image and to extract a pixel forming an edge and a pixel not forming the edge, and wherein the gamma correction unit is configured to perform the second gamma correction to the pixel not forming the edge which is extracted by the determination unit.

5. An image forming apparatus according to claim 1, wherein a ratio of a circumferential speed of the developer carrying member to a circumferential speed of the image bearing member in the second mode is set larger than the ratio of the circumferential speed in the first mode to set a toner application amount per unit area in the second mode to be larger than a toner application amount per unit area in the first mode.

6. An image forming apparatus comprising:

an exposure unit configured to emit light according to a drive signal corresponding to input image data;

an image bearing member on which an electrostatic latent image is formed by an exposure of the exposure unit;

a developer carrying member configured to develop the electrostatic latent image on the image bearing member with a developer, the image forming apparatus being configured to form a toner image in a first mode and in a second mode in which the image forming apparatus is operated under an image forming condition in which developer supplying capability from the developer carrying member to the image bearing member is increased to form the toner image;

a determination unit configured to determine whether an input image is a predetermined condition image in a predetermined condition in which the input image is a fine line having a predetermined width or less, a miniature image, or a character having predetermined points or less; and a correction unit configured to set a line width thin or lighten density for the predetermined condition image at a time of forming the toner image in the second mode, wherein the determination unit is configured to extract a pixel forming an edge and a pixel not forming the edge among pixels forming the predetermined condition range, and wherein the correction unit is configured to determine a correction amount so that a width of the drive signal set for the predetermined condition image in the second mode, which causes the exposure unit to emit light to the pixel forming the edge extracted by the determination unit, is gotten shorter than the width of the drive set for the predetermined condition image in the first mode.

7. An image forming apparatus according to claim 6, wherein the correction unit is configured to cause an area to be emitted with light in the pixel forming the edge to grow in a direction from the pixel not forming the edge to the pixel forming the edge based on a positional relationship between the pixel forming the edge and the pixel not forming the edge.

8. An image forming apparatus according to claim 6, wherein, when the predetermined condition image is a first line image which extends along a direction orthogonal to a rotation direction of the developer carrying member or a second line image which extends in a direction orthogonal to a scanning direction, the correction unit increases a correction amount to make the first line image thinner than the second line image so as to perform correction.

9. An image forming apparatus according to claim 6, further comprising a gamma correction unit configured to perform gamma correction, wherein the determination unit is configured to determine whether image data subjected to the gamma correction by the gamma correction unit is the predetermined condition image.

10. An image forming apparatus according to claim 6, wherein a ratio of a circumferential speed of the developer carrying member to a circumferential speed of the image bearing member in the second mode is set larger than the ratio of the circumferential speed in the first mode to set a toner application amount per unit area in the second mode to be larger than a toner application amount per unit area in the first mode.

11. An image forming apparatus comprising:

a scanner configured to emit light according to a drive signal corresponding to input image data;

an image bearing member on which an electrostatic latent image is formed by an exposure of the exposure unit;

a developer carrying member configured to develop the electrostatic latent image on the image bearing member with a developer, the image forming apparatus being configured to form a toner image in a first mode and in a second mode in which the image forming apparatus is operated under an image forming condition in which developer supplying capability from the developer carrying member to the image bearing member is increased to form the toner image; and a controller configured to execute a program stored in a memory to function as:

a determination unit configured to determine whether an input image is a predetermined condition image in a predetermined condition in which the input image is a fine line having a predetermined width or less, a miniature image, or a character having predetermined points or less; and a correction unit configured to set a line width thin or lighten density for the predetermined condition image at a time of forming the toner image in the second mode, wherein the correction unit is configured to determine a correction amount so that a width of the drive signal set for the predetermined condition image in the second mode, which causes the exposure unit to emit light for a pixel forming the predetermined condition image, is gotten shorter than the width of the drive set for the predetermined condition image in the first mode.

12. An image forming apparatus according to claim 11, further comprising a process cartridge including at least the image bearing member, wherein the correction unit is configured to determine the correction amount based on temperature and humidity in an environment in which the image forming apparatus is installed, or based on a usage status of the process cartridge.

13. An image forming apparatus according to claim 11, wherein the controller is further configured to execute the program stored in the memory to function as a gamma correction unit configured to perform gamma correction, wherein the determination unit is configured to determine whether image data subjected to the gamma correction by the gamma correction unit is the predetermined condition image.

14. An image forming apparatus according to claim 11, wherein the controller is further configured to execute the program stored in the memory to function as a gamma correction unit configured to perform a first gamma correction used in the first mode and a second gamma correction set to lower the density than the first gamma correction, wherein the determination unit is configured to determine whether image data before the gamma correction is performed by the gamma correction unit is the predetermined condition image and to extract a pixel forming an edge and a pixel not forming the edge, and wherein the gamma correction unit is configured to perform the second gamma correction to the pixel not forming the edge which is extracted by the determination unit.

15. An image forming apparatus according to claim 11, wherein a ratio of a circumferential speed of the developer carrying member to a circumferential speed of the image bearing member in the second mode is set larger than the ratio of the circumferential speed in the first mode to set a toner application amount per unit area in the second mode to be larger than a toner application amount per unit area in the first mode.

* * * * *